(12) United States Patent
Katsuragi et al.

(10) Patent No.: US 7,376,785 B2
(45) Date of Patent: May 20, 2008

(54) STORAGE DEVICE AND WRITE ACCESS PROCESSING METHOD FOR STORAGE DEVICE

(75) Inventors: Eiju Katsuragi, Odawara (JP); Mikio Fukuoka, Odawara (JP)

(73) Assignee: Hitachi, Ltd., Tokyo (JP)

( * ) Notice: Subject to any disclaimer, the term of this patent is extended or adjusted under 35 U.S.C. 154(b) by 440 days.

(21) Appl. No.: 10/990,500

(22) Filed: Nov. 18, 2004

(65) Prior Publication Data
US 2006/0064550 A1 Mar. 23, 2006

(30) Foreign Application Priority Data
Sep. 22, 2004 (JP) ............................. 2004-275101

(51) Int. Cl.
*G06F 12/00* (2006.01)
(52) U.S. Cl. .................... 711/112; 711/113; 711/114
(58) Field of Classification Search .................. 711/114
See application file for complete search history.

(56) References Cited

U.S. PATENT DOCUMENTS 5,761,705 A * 6/1998 DeKoning et al. .......... 711/113

2003/0212921 A1 * 11/2003 Howe ............................ 714/8

FOREIGN PATENT DOCUMENTS

JP 6-309232 11/1994

* cited by examiner

*Primary Examiner*—Sanjiv Shah
*Assistant Examiner*—Thanh D. Vo
(74) *Attorney, Agent, or Firm*—Antonelli, Terry, Stout & Kraus, LLP.

(57) ABSTRACT

The present invention allows the processing mode for write access operations to be set independently and respectively for prescribed units. The processing modes for handling write access are set previously for each of the volumes 6A and 6B. If the cache memory is functioning normally, write access operations to the respective volumes 6A and 6B are processed by means of an after-write method as illustrated in FIG. 1(*a*). If an abnormality has occurred in the cache memory, then write access operations to the volumes 6A and 6B are processed by means of a method previously selected from a write-through method as illustrated in FIG. 1(*b*) or a non-redundant storage type write-after method as illustrated in FIG. 1(*c*). By using different processing modes for write access, for each of the volumes 6A and 6B, it is possible to set a suitable processing mode respectively for each of the prescribed units, in accordance with the composition of the storage system, the operation configuration, and the like.

20 Claims, 38 Drawing Sheets

FIG. 6(a)
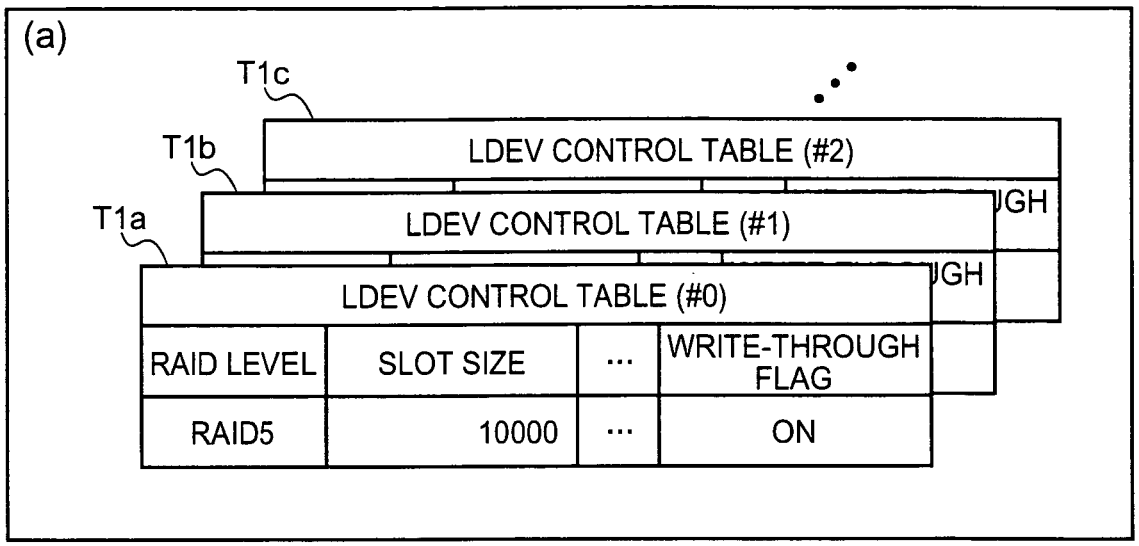
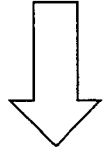
FIG. 6(b)

FIG. 9(a)

| PARITY GROUP # | RAID LEVELL | DRIVE TYPE | | |
|---|---|---|---|---|
| | | DISK TYPE | CAPACITY | VENDOR |
| 1 | RAID5 | FC | 2GB | CO. H |
| 2 | RAID5 | FC | 2GB | CO. H |
| 3 | RAID1 | SATA | 1GB | CO. H |
| 4 | RAID1 | SATA | 1GB | CO. H |
| ... | ... | ... | ... | ... |

T5

DESTAGE BUTTON — B1

FIG. 9(b)

| LDEV # | WRITE-THROUGH FLAG |
|---|---|
| 0 | ON |
| 1 | ON |
| 2 | ON |
| 3 | ON |
| 4 | ON |
| ... | ... |

CHANGE BUTTON B2

FIG. 9(c)

| LDEV # | WRITE-THROUGH FLAG |
|---|---|
| 0 | OFF |
| 1 | OFF |
| 2 | OFF |
| 3 | ON |
| 4 | ON |
| ... | ... |

CHANGE BUTTON B2

FIG. 15

| LDEV NUMBER CONVERSION TABLE | | | T3 |
|---|---|---|---|
| PORT # | LUN | LDEV # | |
| 0 | 0 | 0 | } ONE LU CONSTITUTED BY LINKING A PLURALITY OF LDEVS |
| 0 | 0 | 10 | |
| ... | ... | ... | |
| 1 | 0 | 10 | |
| ... | ... | ... | |

STORAGE DEVICE AND WRITE ACCESS PROCESSING METHOD FOR STORAGE DEVICE

CROSS-REFERENCE TO RELATED APPLICATIONS

This application relates to and claims priority from Japanese Patent Application No. 2004-275101 filed on Sep. 22, 2004, the entire disclosure of which is incorporated herein by reference.

BACKGROUND OF THE INVENTION

The present invention relates to a storage device and a write access processing method for a storage device.

This storage device provides a storage area based on a RAID (Redundant Arrays of Inexpensive Disks) system, wherein disk drives, such as hard disk drives, or the like, are arranged in an array configuration. A host computer (hereinafter, called "host") accesses the logical storage area provided by the storage device and reads or writes data.

The storage device stores write data received from the host, on the disk drives, via a cache memory. Furthermore, for example, if data requested by the host is not stored in the cache memory, then the storage device reads out the data requested by the host, from a disk drive, stores that data in the cache memory, and then supplies the data to the host via the cache memory.

In this way, write data requested for writing by the host is held in the cache memory, and then written to a prescribed disk drive. The method for writing data from the cache memory to a disk drive can be divided broadly into two types of method.

One method is a so-called "write-through" method, for example, wherein the writing of write data to the cache memory and the writing of write data to the disk drive is carried out in a substantially simultaneous fashion. The other method is a so-called "copy back" method or "after-write" method, for example, wherein the write data is stored in the cache memory only, and at a prescribed timing thereafter, the write data in the cache memory is written to a disk drive (see Japanese Patent Laid-open No. (Hei)6-309232.)

In the write-through method, the completion of the write operation is reported to the host when the write data has been written to the disk drive. In the after-write method, the completion of the write operation is reported to the host when the write data has been stored in the cache memory. Therefore, the after-write method allows the response time to be compressed to a greater extent than the write-through method.

SUMMARY OF THE INVENTION

In a conventional storage device, it is possible to switch between a write-through method and an after-write method for the storage device as a whole, but it is not possible, for example, to set write methods individually for units specified by the user, for instance, different methods cannot be applied respectively to different logical volumes, and therefore usability is poor.

Therefore, one object of the present invention is to provide a storage device and a write access processing method for a storage device whereby any one processing mode of a plurality of processing modes for write access can be applied respectively and individually to prescribed units. Furthermore, one object of the present invention is to provide a storage device and a write access processing method for a storage device whereby processing modes for write access can be established respectively and individually for prescribed units, and the same processing mode can be applied to respective prescribed units which are mutually related. One object of the present invention is to provide a storage device and a write access processing method for a storage device whereby the established processing mode can be changed in accordance with the circumstances of another storage device. Further objects of the present invention will become apparent from the following description of the embodiments.

In order to achieve the aforementioned objects, the storage device relating to the present invention comprises: a controller for respectively controlling data transmission and reception between a host device and a group of storage devices; and a cache memory used by the controller, for storing write data received from the host device, in a non-redundant fashion or a redundant fashion. The controller is previously provided with processing modes for cases where a write command is received from the host device, namely: (1) a first processing mode wherein the completion of processing is reported to the host device when the write data has been stored in a redundant fashion in the cache memory, and the write data stored in a redundant fashion in the cache memory is written to the group of storage devices at a prescribed timing; (2) a second processing mode wherein the completion of processing is reported to the host device when the write data stored in a non-redundant fashion in the cache memory has been written to the group of storage devices; and (3) a first processing mode wherein the completion of processing is reported to the host device when the write data has been stored in a redundant fashion in the cache memory, and the write data stored in a redundant fashion in the cache memory is written to the group of storage devices at a prescribed timing; and the controller is able to execute any one of the processing modes for each of prescribed units that have been established previously.

Here, as the prescribed unit, it is possible to use any one or a combination of: a logical volume established on a group of physical storage areas of a group of storage devices; a logical unit (LU) associated with logical volume established on a group of physical storage areas of a group of storage devices; a group of physical storage areas of a group of storage devices; a type of storage device; and a virtual frame generated by dividing the group of storage devices and the cache memory on a logical basis.

Moreover, redundant storage means that other data apart from the original data is also stored in conjunction with the original data, in order to prevent data loss. For example, the write data is stored respectively in a plurality of cache regions, or the data is saved in a restorable fashion, using parity data, or the like. On the other hand, non-redundant storage means that the original data only is stored, directly. Therefore, data stored in a redundant fashion has high resistance to data loss.

The controller preferentially executes the first processing mode, and if the cache memory is not able to store the write data in a redundant fashion, then the controller can execute either one of the second processing mode or the third processing mode.

The controller preferentially executes the first processing mode, and if the cache memory is not able to store the write data in a redundant fashion, then the controller can execute either one of the second processing mode or the third processing mode, on the basis of previously established mode selection information.

The controller can preferentially execute the first processing mode if the cache memory is able to store the write data in a redundant fashion, the controller can preferentially execute the second processing mode if the cache memory is not able to store the write data in a redundant fashion, and the controller can execute the third processing mode if the cache memory is not able to store the write data in a redundant fashion and if the third processing mode has been selected by means of mode selection information.

The controller can manage mode selection information for previously setting an order of priority for the respective processing modes, in association with each of the prescribed units, on the basis of instructions from an external device.

The controller may adopt the same processing mode respectively for prescribed units that are mutually related among the prescribed units.

The controller may also set any one processing mode of the processing modes respectively for each of the prescribed units, by taking account of the circumstances of another storage device that receives and stores the write data.

The controller may also change a prescribed unit for which the third processing mode is set to either one of the second processing mode or the first processing mode, if a fault has occurred in another storage device that receives and stores the write data.

In a write access processing method for a storage device according to a further aspect of the present invention, (1) a first processing mode wherein the completion of processing is reported to the host device when the write data has been stored in a redundant fashion in the cache memory, and the write data stored in a redundant fashion in the cache memory is written to the group of storage devices at a prescribed timing; (2) a second processing mode wherein the completion of processing is reported to the host device when the write data stored in a non-redundant fashion in the cache memory has been written to the group of storage devices; and (3) a first processing mode wherein the completion of processing is reported to the host device when the write data has been stored in a redundant fashion in the cache memory, and the write data stored in a redundant fashion in the cache memory is written to the group of storage devices at a prescribed timing; are provided; and the write access processing method for a storage device comprises the steps of: setting mode selection information respectively for each one of prescribed units; receiving the write data from the host device; judging whether or not the cache memory is capable of redundant storage; executing the first processing mode if it is judged that the cache memory is capable of redundant storage; judging whether or not the second processing mode is selected by the established mode selection information, if it is judged that the cache memory is not capable of redundant storage; executing the second processing mode, if it is judged that the second processing mode has been selected on the basis of the mode selection information; and executing the third processing mode, if it is judged that the second processing mode has not been selected on the basis of the mode selection information.

At least a portion of the means, functions and steps according to the present invention may be constituted by computer programs which are read in and executed by a microcomputer. Computer programs of this kind may be distributed by copying them onto a storage medium, such as a hard disk, optical disk, or the like. Alternatively, computer programs may also be supplied via a communications network, such as the Internet.

BRIEF DESCRIPTION OF THE DRAWINGS

FIG. 6($a$) is an illustrative diagram showing an LDEV control table, and FIG. 6($b$) is an illustrative diagram showing a write-through flag management table in which the write-through flags established for each LDEV control table are extracted and displayed in a list format;

FIG. 9 is an illustrative diagram showing an example of a screen for setting a write-through flag for individual LDEVs;

FIG. 15 is an illustrative diagram showing an LDEV number conversion table used in the second embodiment;

DESCRIPTION OF THE SPECIFIC EMBODIMENTS

Figure 1A:
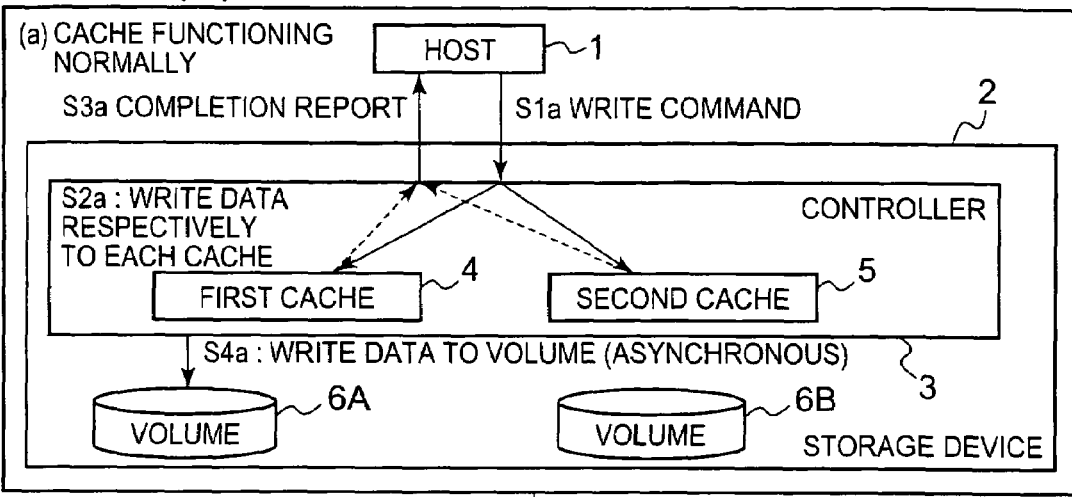
FIG. 1 is an illustrative diagram showing the concept of an embodiment of the present invention.

Below, embodiments of the present invention are described with respect to the drawings. FIG. 1 is an illustrative diagram showing an overview of the present embodiment. The storage system according to the present embodiment is constituted by a host 1 and a storage device 2. The storage device 2 comprises a controller 3, and a plurality of logical volumes (hereinafter, abbreviated to "volumes") 6A and 6B. The controller 3 controls the operations of the storage device 2 and comprises a cache memory having a first cache region 4 and a second cache region 5.

As described hereinafter, the controller 3 comprises three types of modes for processing write access from a host 1, and the applicable processing modes can be set in advance for each respective volume 6A, 6B.

FIG. 1(a) shows first write access processing in a case where the cache memory is in a normal state. When the controller 3 receives a write command from the host 1 (S1a), the write data received from the host 1 is written respectively to the cache regions 4 and 5, thus storing the write data in a redundant fashion (S2a). Immediately upon writing the write data to the respective cache regions 4 and 5, the controller 3 reports the completion of write command processing to the host 1 (S3a). Thereupon, the controller 3 writes one of the write data written to the cache regions 4 and 5, to a prescribed volume 6A (S4a). This example relates to a case where write data is written to the volume 6A, but it is also possible for the write data to be written to the other volume 6B, or for the write data to be written respectively to both of the volumes 6A and 6B.

As shown in FIG. 1(a), when the cache memory is operating normally and the write data can be stored in a redundant fashion, the time at which the completion of writing to the host 1 is reported and the time at which the write data is written to the volumes 6A or 6B are not matching, and hence the timings are asynchronous.

Figure 1B:
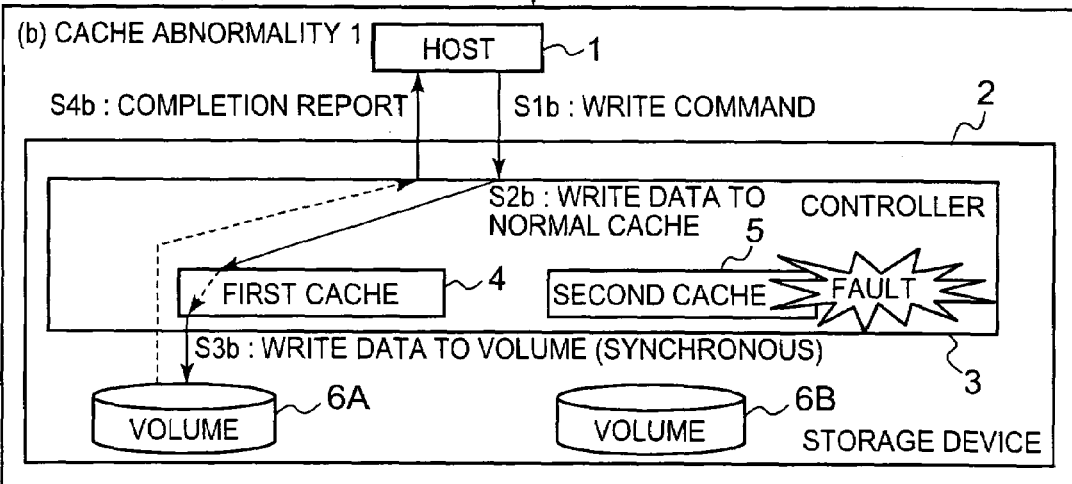

FIG. 1(b) shows a second write access process in a case where redundant storage is not possible due to the occurrence of an abnormality in the cache memory. For example, it shows a situation where a write access received from the host 1 is processed in a case where a problem has occurred in one of the cache regions and that cache region has been closed off. In this example, it is supposed that a problem has occurred in the second cache region 5, and that only the first cache region 4 can be used.

Upon receiving a write command from the host 1 (S1b), the controller 3 stores the write data received from the host 1 in the cache region 4 that is functioning normally (S2b). Thereupon, the controller 3 writes the write data stored in the cache region 4 immediately to the prescribed volume 6A (S3b). When the controller 3 confirms that writing of write data to the volume 6A has been completed, it reports the completion of the write operation to the host 1 (S4b).

In this way, in one example where a fault has occurred in a cache memory, the write data received from the host 1 is written immediately to the prescribed volume 6A and the completion of the write operation is reported to the host 1.

Figure 1C:
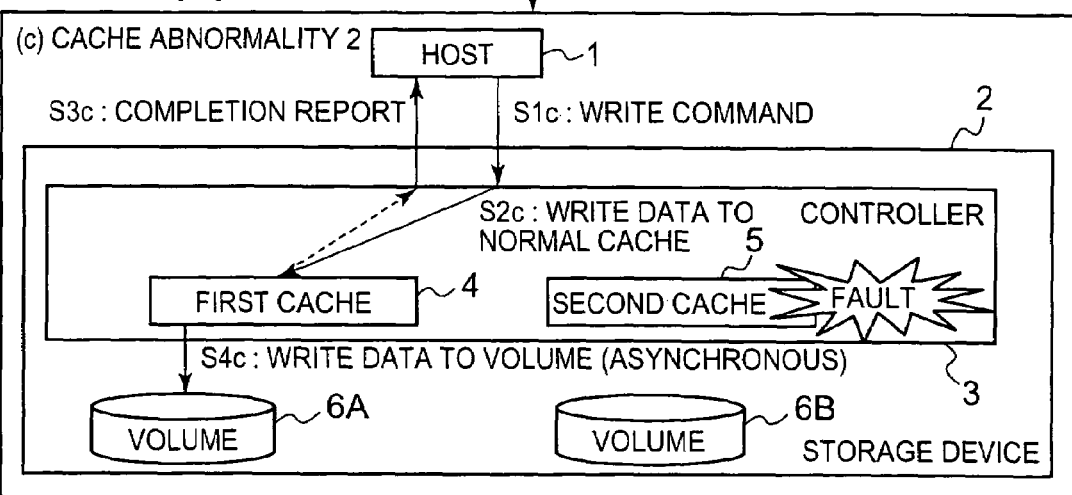

FIG. 1(c) shows a third write access processing in a case where redundant storage is not possible due to the occurrence of an abnormality in the cache memory. In this case, upon receiving a write command from the host 1 (S1c), the controller 3 writes the write data received from the host 1 to the cache region 4 that is functioning normally (S2c). Immediately upon writing the write data to the normal cache region 4, the controller 3 reports the completion of the write operation to the host 1 (S3c). After reporting the completion of the write operation, the controller 3 then writes the write data stored in the cache region 4, to the prescribed volume 6A (S4c).

In this way, in a further example of a case where a fault has occurred in the cache memory, the completion of the write operation is reported to the host 1 immediately upon writing the write data received from the host 1 to the normal cache region 4, and the write data is subsequently written to the prescribed volume 6A.

In the present embodiment, the processing modes for handling write access can be set previously for each of the volumes 6A and 6B. In one example, if the cache memory is functioning normally, write access operations to the respective volumes 6A and 6B can be processed by means of an after-write method as illustrated in FIG. 1(a). However, if an abnormality has occurred in the cache memory, then write access operations to the volumes 6A and 6B can be processed by means of a method previously selected from a write-through method as illustrated in FIG. 1(b) or a non-redundant storage type write-after method as illustrated in FIG. 1(c).

More specifically, for example, if the method illustrated in FIG. 1(c) is selected for volume 6A, then when the cache memory is functioning normally, a write access to that volume 6A will be processed by means of the after-write method illustrated FIG. 1(a), but if an abnormality has occurred in the cache memory, then the write access will be processed by means of a non-redundant after-write method as illustrated in FIG. 1(c). More specifically, for example, if the method illustrated in FIG. 1(b) is selected for the other volume 6B, then when the cache memory is functioning normally, a write access to that volume 6B will be processed by means of the after-write method illustrated FIG. 1(a), but if an abnormality has occurred in the cache memory, then the write access will be processed by means of a write-through method as illustrated in FIG. 1(b).

In this way, in the present embodiment, different processing modes for handling write access operations can be set for the respective volumes 6A and 6B. As described in more detail later, the processing modes may be specified manually by the user for each of the volumes, or they may be specified automatically by the controller 3 on the basis of a previously established policy. Moreover, it is also possible to set suitable processing modes respectively for each of the volumes, by means of the controller 3 assisting manual instructions made by the user.

By this means, suitable processing modes can be established respectively for prescribed storage units, in accordance with the composition and operation configuration of the storage system, and hence usability is improved. For example, in the case of volumes storing important data, priority is given to the safety of the data and therefore a write-through method is set as the processing mode in the event of an abnormality in the cache memory, whereas conversely, in the case of volumes storing data having low importance, priority is given to maintaining access performance, and therefore a non-redundant storage type after-write method can be set as the processing mode in the event of an abnormality in the cache memory.

As is clear from the following embodiments, the processing mode adopted for write access operations is not limited being specified for volume units, and it may also be specified respectively for various logical or physical constituent units of the system, for instance, for each respective logical unit, each RAID group, or the like.

1. First Embodiment

Figure 2:
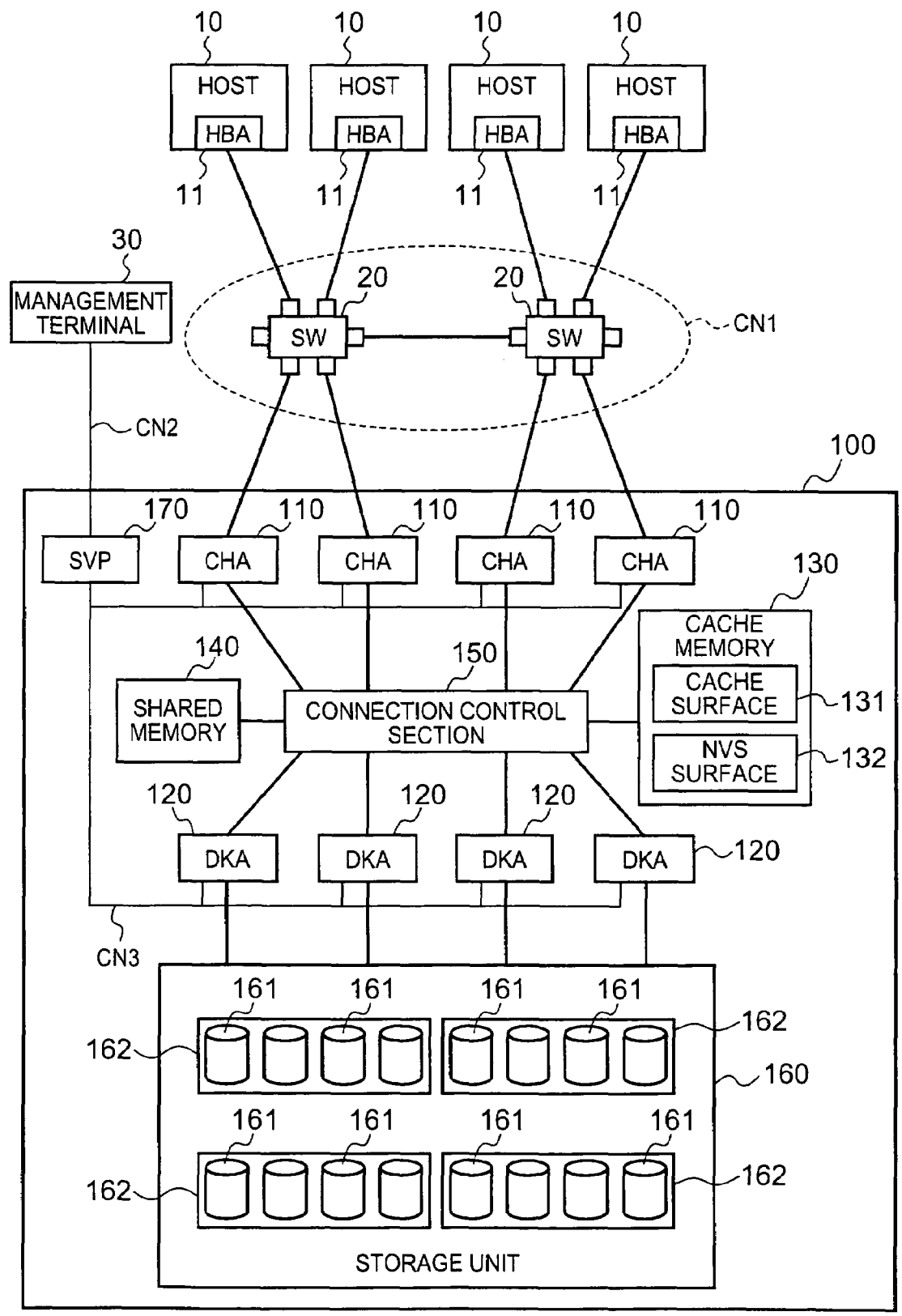
FIG. 2 is a block diagram focusing on the hardware composition of a storage device.

FIG. 2 is a block diagram of a storage system. This storage system may be constituted by comprising, for example, at least one or more host 10, at least one or more storage device 100, switches 20 for constituting a communications network between the host(s) 10 and the storage device 100, and a management terminal 30. As described hereinafter, the storage system may be constituted by comprising a plurality of storage devices 100 and 200.

Hosts 10 can be divided broadly into so-called open type host and mainframe type hosts, for example. Examples of an open type host include server machines which run a generic OS (Operating System), such as Windows (registered trademark), UNIX (registered trademark), or the like, and access the storage device 100 by means of a relatively generic communications protocol, such as FC (Fiber Channel), iSCSI (Internet SCSI), TCP/IP (Transmission Control Protocol/Internet Protocol), or the like. Examples of a mainframe type host are mainframe machines which access the storage device 100 by means of a communications protocol, such as FICON (Fiber Connection: registered trademark), ESCON (Enterprise System Connection: registered trademark), ACONARC (Advanced Connection Architecture: registered trademark), FIBARC (Fiber Connection Architecture registered trademark), or the like, for example.

The hosts 10 are connected to the storage device 100 by means of a communications network CN1 which may comprise metal cables, fiber-optic cables, switches 20, and the like, for example. Firstly, to describe the composition of a host 10 with reference to FIG. 3, the host 10 may be constituted by comprising, for example, one or a plurality of HBAs (Host Bus Adapters) 11, a path control section 12, and an application program 13. The HBAs 11 transmit and receive data on the basis of a prescribed protocol. The path control section 12 serves to distribute load and avoid faults, for example, and it controls the path used to transmit and receive data, and the like. The application program 13 is a program such as an electronic mail processing program or database management software, or the like, and it provides information processing services to client terminals, which are located outside the drawing.

Returning to FIG. 2, the management terminal 30 is a device for collecting various types of information relating to the storage device 100, by means of a service processor (SVP) 170, which is described later, and issuing necessary commands to the storage device 100. The management terminal 30 is connected to the SVP 170 via a communications network CN2, such as a LAN (Local Area Network), for example. The management terminal 30 is provided with a GUI (Graphical User Interface) based on a web browser, and information is collected and commands are input by logging in to a WWW (World Wide Web) server provided by the SVP 170.

The storage device 100 can be constituted by comprising, for example, a plurality of CHAs 110, a plurality of DKAs 120, a cache memory 130, a shared memory 140, a connection control section 150, a storage section 160, and an SVP 170.

A plurality of CHAs 110 may be provided in the storage device 100. Each CHA 110 is a package for controlling data transfer to and from a respective host 10. Each CHA 110 has a plurality of communications ports 111 (see FIG. 2), and is able to connect with at least one or more host 10. The CHAs 110 respectively control data transfer to and from a host 10, in an independent fashion.

A plurality of DKAs 120 may be provided in the storage device 100. The DKAs 120 respectively control data transfer to and from the storage section 160. For example, each of the DKAs 120 accesses the respective disk drives 161 and performs data read out or data writing, by converting a logical block address (LBA) designated by the host 10 into an address on a physical disk.

The cache memory 130 stores write data written from the host 10 and read data read out from the host 10. The cache memory 130 may be constituted by a volatile or a non-volatile memory, for example. If the cache memory 130 is constituted by a volatile memory, then desirably, a memory back-up is performed by means of a battery power source, or the like, which is not illustrated.

The cache memory 130 may be constituted by two regions, namely, a read cache region and a write cache region, for example. The write cache region may, for example, be constituted by a cache surface 131 and a NVS (Non-Volatile Storage) surface 132. By this means, the data stored in the write cache region can be stored in a multi-layered (redundant) fashion. In other words, since read data is also present on the disk drive 161 in exactly the same form, then even if this read data happens to be lost, it simply needs to be read out again from the disk drive 161, and hence there is no need for multi-layered storage. On the other hand, write data is only present in the cache memory 130 of the storage device 100, and therefore, in principle, from the viewpoint of reliability it is desirable to store it in a multi-layered fashion.

The shared memory (which may also be called the control memory) 140 may be constituted by a non-volatile memory, or it may be constituted by a volatile memory. Control information, management information, and the like, is stored in the shared memory 140, for example. Information, such as this control information, and the like, can be managed in a multi-layered fashion by means of a plurality of memories 140.

Here, the shared memory 140 and the cache memory 130 may be constituted respectively by separate memory packages, or the cache memory 130 and the shared memory 140 may be provided in the same memory package. Furthermore, one portion of the memory may be used as a cache region and another-portion thereof may be used as a control region. In other words, the shared memory and the cache memory may also be constituted as the same memory or memory group.

A connection control section 150 respectively connects together the respective CHAs 110, the respective DKAs 120, the cache memory 130 and the shared memory 140. Thereby, all of the CHAs 110 and the DKAs 120 may respectively access the cache memory 130 and the shared memory 140, in an independent fashion. The connection control section 150 may be constituted as an ultra-high-speed cross-bar switch, or the like, for example.

The CHAs 1110, DKAs 120, cache memory 130 and shared memory 140 may be integrated into one or a plurality of controllers.

The storage section 160 is constituted by a plurality of disk drives 161. The storage section 160 may be provided in the same frame as the controller sections, such as the respective CHAs 110 and the respective DKAs 120, or it may be provided in a separate frame from the controller sections.

The storage section 160 may be constituted by a combination of disk drives 161 of a plurality of different types, for example. For the disk drives 161, it is possible to use, for example, an FC disk (fiber channel disk), a SCSI (Small Computer System Interface) disk, a SATA (Serial AT Attachment) disk, or the like. The types of disk are not limited to those mentioned above, and there may be cases where storage devices equivalent to the indicated disk drives or storage devices developed in the future can be used.

Here, in general, the data processing performance declines in order, from an FC disk, to a SCSI disk to a SATA disk. Currently, the highest data processing performance is provided by FC disks. The data processing performance may include, for example, the IOPS (input/output per second), the MB/s performance, the data access time, or the like. For example, FC disks having high performance and high reliability are used in cases where mission-critical data must be accessible at high speed, whereas SATA disks having lower performance than FC disks are used to save archive data which is not subject to high-speed access requirements, or the like.

The storage section 160 may comprise a plurality of parity groups (also called "RAID groups"). Each parity group 162 is constituted respectively by physical disks 161 of the same type. More specifically, one parity group 162 may be constituted by FC disks only, and another parity group 162 may be constituted by SATA disks only. Furthermore, a parity group 162 may also be constituted by SCSI disks only.

As described in more detail later, at least one or more logical volumes (also called "LDEVs") 163 may be provided in the logical storage areas provided respectively by each of the parity groups 162. By associating these logical volumes 163 with a LU (Logical Unit) 164, an open type host 10 is able to recognize the logical volumes as physical storage devices and to use same. An LU is a volume that is accessible by an open type host 10, whereas the unit accessed by a mainframe type host is a logical volume (LDEV).

The storage resources used by the storage device 100 do not have to be located entirely within the storage device 100. The storage device 100 is able to incorporate and use storage resources existing externally to the storage device 100, exactly as if there were its own storage resources. More specifically, for example, the storage device 100 is able to connect directly with an externally located storage device (not illustrated) belonging to the same company or another company, by means of a SAN (Storage Area Network), or the like, without passing via a host 10. The storage device 100 is able to incorporate external logical volumes by mapping logical volumes belonging to an external storage device, to its own LU or LDEV or intermediate volumes.

The SVP 170 is connected respectively to each of the CHAs 110 and the DKAs 120, by means of an internal network CN3, such as a LAN. The SVP 170 gathers the various internal statuses of the storage device 100 and supplies them to the management terminal 30, either directly or after processing.

Figure 3:
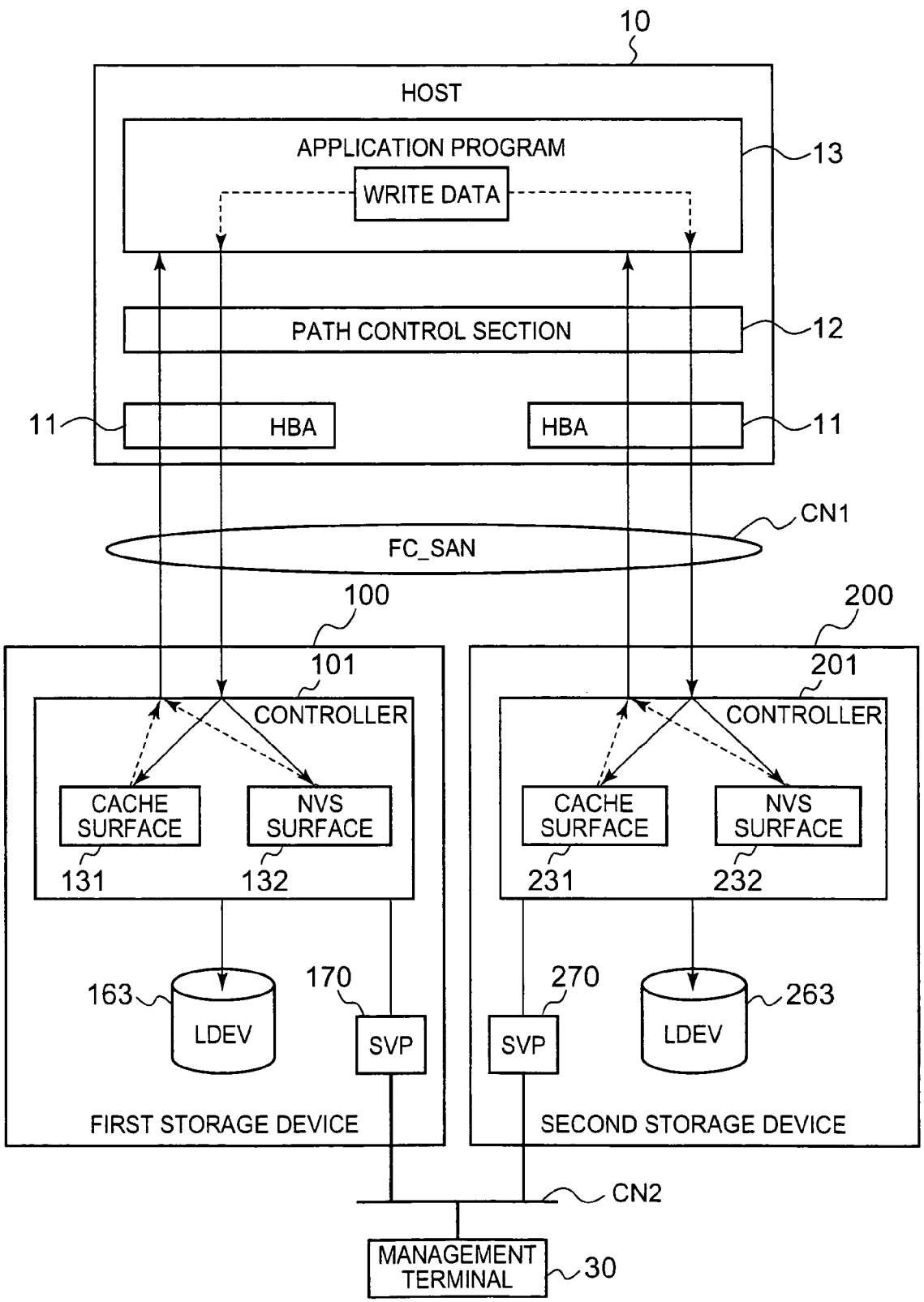
FIG. 3 is a general composition diagram of a storage system focusing on write access processing.

FIG. 3 is an illustrative diagram showing the general composition of a storage system comprising a plurality of storage devices 100 and 200. The other storage device 200 may be constituted in a similar manner to the storage device 100, for example, by comprising a controller 201, LDEVs 263, a SVP 270, and the like, and the controller 201 is provided with a cache surface 231 and an NVS surface 232.

A host 10 is able to write and save the same write data respectively to each of the storage devices 100 and 200. In this case, even if an abnormality occurs in the cache memory 130 of one storage device 100 and redundant storage becomes impossible, the same write data is still retained in the other storage device 200.

Consequently, in the storage system as a whole, redundancy of the write data is ensured, and even if a write access is processed by means of an after-write method in a case where there is an abnormality in the cache memory of the storage device 100, the reliability will not decline.

Figure 4:
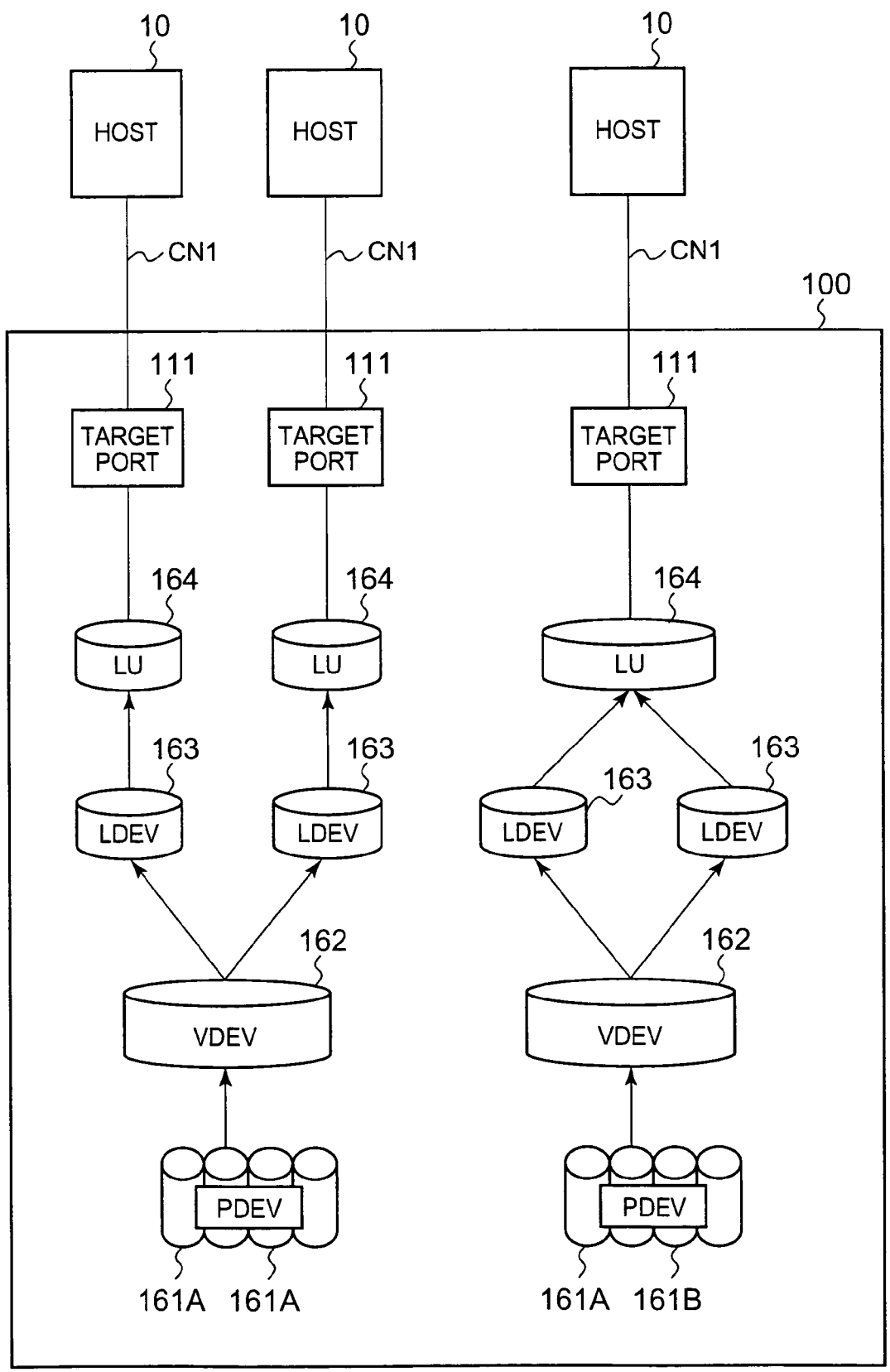
FIG. 4 is an illustrative diagram focusing on the logical composition of a storage device.

FIG. 4 is an illustrative diagram focusing on the logical structure of the storage device 100. The logical structure of the storage device 100 may be constituted by PDEVs (Physical Devices) 161, which are physical disks, VDEVs (Virtual Devices) 162, which are virtual storage areas provided by a grouped plurality of PDEVs 161, and LDEVs (Logical Devices) 163 which are established on these VDEVs 162. Here, a PDEV 161 corresponds to a disk drive 161 in FIG. 2 and a VDEV 162 corresponds to a parity group 162 in FIG. 2.

Here, LUNs (Logical Unit Numbers) are allocated respectively to several logical volumes (LDEVs), and these logical volumes are recognized as an LU 164 by an open type host 10. The open type host 10 accesses the respective logical volumes (LU 164) to which it has access rights, by means of a target port 111. A target port 111 is a communications port provided by each of the CHAs 110 in FIG. 2.

Figure 5:
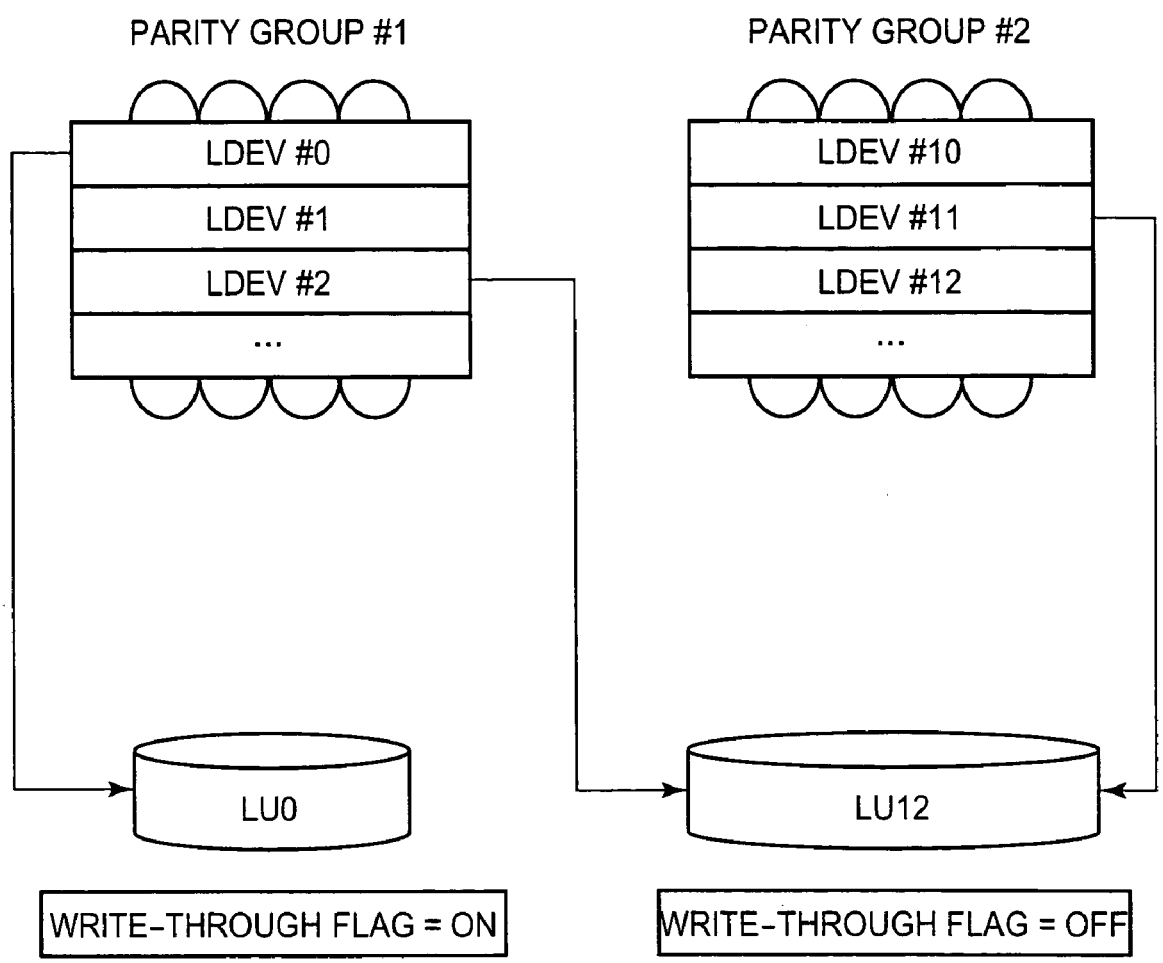
FIG. 5 is an illustrative diagram showing the correspondence between parity groups, logical volumes (LDEV), and logical units (LU)

As shown in FIG. 4 and FIG. 5, a plurality of LDEVs can be provided respectively on the storage areas provided by a parity group (VDEV). As shown on the left-hand side of FIG. 4, it is possible to make one LDEV correspond to one LU, or as shown on the right-hand side of FIG. 4, it is also possible to make a plurality of LDEVs correspond to one LU. FIG. 4 shows a situation where one type of PDEV 161A is combined with another type of PDEV 161B, and LDEVs are formed by each respective parity group.

Moreover, as shown on the right-hand side of FIG. 5, it is also possible to make a plurality of LDEVs belonging to different parity groups correspond to one LU. Furthermore, as shown in FIG. 5, write-through flags are associated respectively with each of the LUs "#0" and "LU#12". As described in detail later, a pseudo through flag is information for previously specifying a processing mode for write access in the case of a cache abnormality, and different values for this flag can be set respectively for each prescribed unit. An embodiment where write-through flags are set in LU units is described below.

FIG. 6 is an illustrative diagram showing one example of an LDEV control table T1. A LDEV control table T1 is provided respectively for each LDEV, as indicated by T1a-T1c in FIG. 6(b), for example. The LDEV control table T1 comprises, for example, the RAID level of the corresponding LDEV, attribute information, such as the slot size (storage capacity), and the aforementioned write-through flag.

The write-through flag is set independently for each LDEV. When the write-through flags established for each LDEV are respectively extracted, it is possible to obtain a write-through flag management table T2 such as that shown in FIG. 6(b).

Figure 7:
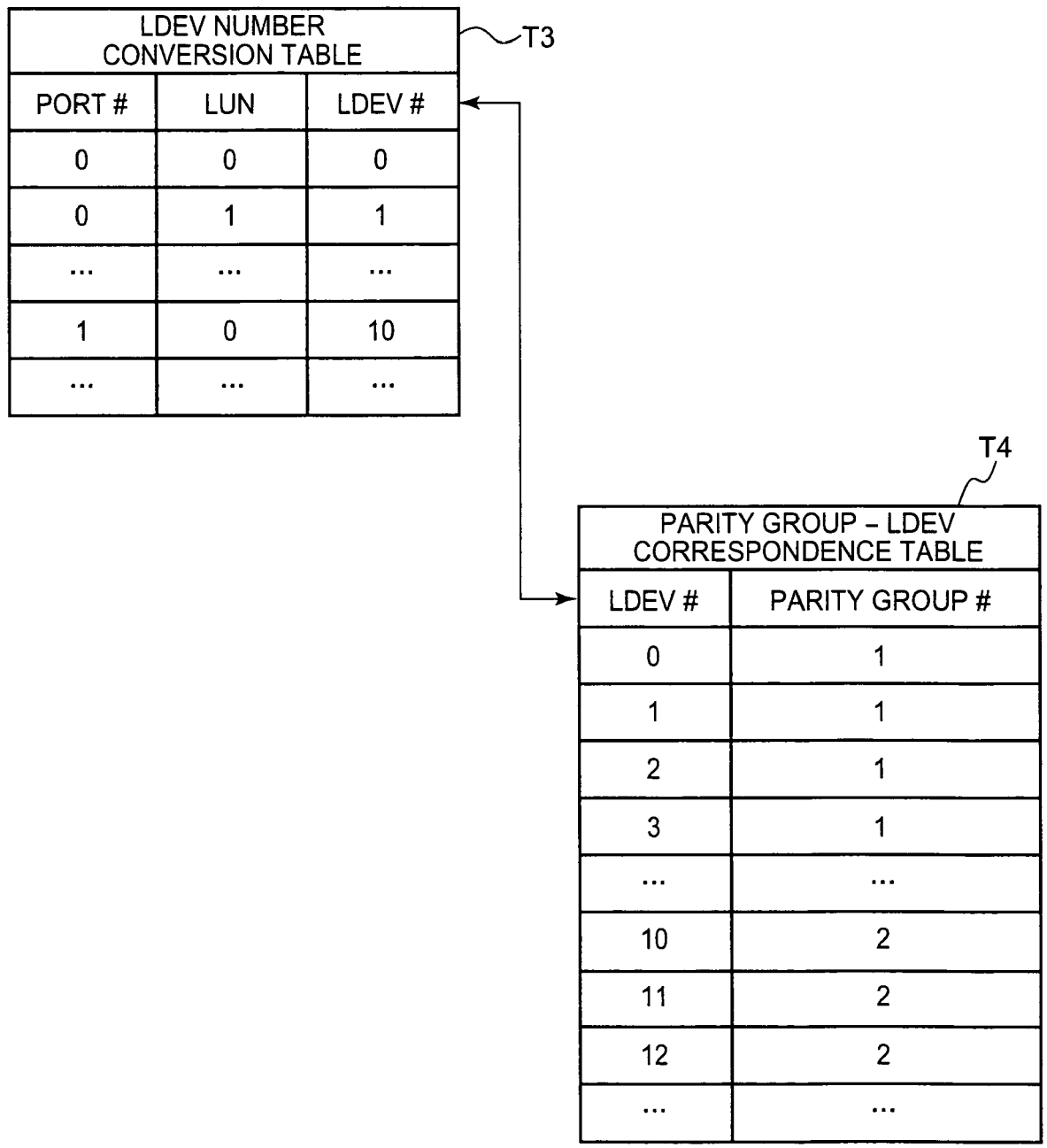
FIG. 7 is an illustrative diagram showing the relationship between an LDEV number conversion table and a parity group-LDEV correspondence table.

FIG. 7 is an illustrative diagram showing one example of an LDEV number conversion table T3 band a parity group—LDEV correspondence table T4. The LDEV number table T3 may be composed by associating, for example, a port number, a LUN (Logical Unit Number), and an LDEV number. By referring to this LDEV number conversion table T3, it is possible to determine which of the LDEVs is to be accessed.

The parity group—LDEV correspondence table T4 may be composed by respectively associating LDEV numbers and the number of the parity group to which the LDEV belongs. By this means, all of the LDEVs belonging to a particular group can be extracted, and it can be investigated which of the parity groups a particular LDEV belongs to.

Figure 8:
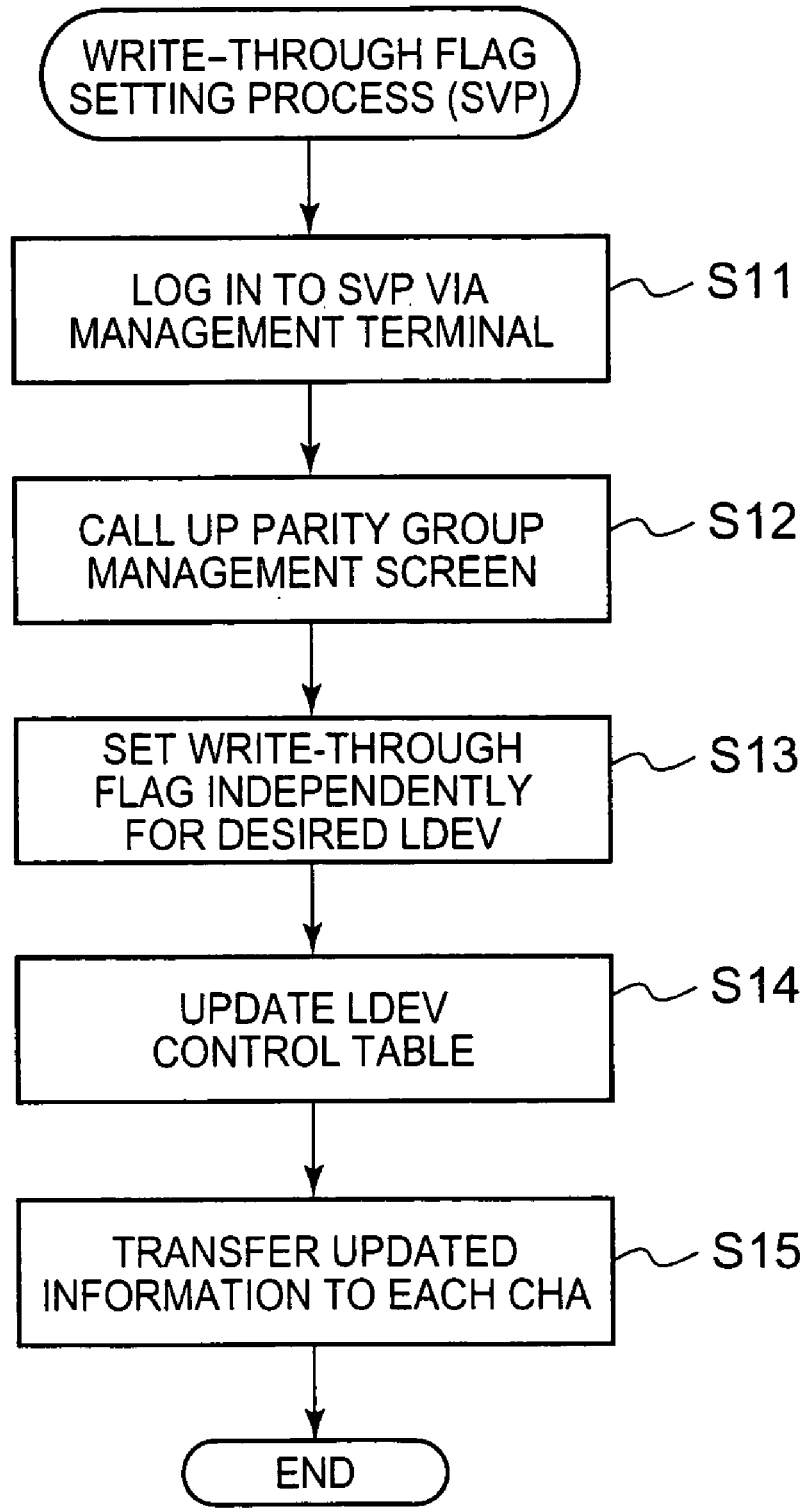
FIG. 8 is a flowchart showing a write-through flag setting process.

FIG. 8 is a flowchart showing an overview of a write-through flag setting process for setting a write-through flag for each LDEV. This processing may be executed by the SVP 170, for example.

For instance, a user, such as the system administrator, logs in to the web server provided by the SVP 170 via the web browser of the management terminal 30 (S11), and calls up a parity group management screen (S12). The user sets write-through flags, independently, for a desired one or plurality of LDEVs, whilst observing the parity group management screen (S13). When the user has completed write-through flag settings, the SVP 170 updates the LDEV control table T1 stored in the shared memory 140 (S14). Furthermore, the SVP 170 causes the updated LDEV control table T1 to be transferred to the respective CHAs 110 (S15). Each of the CHAs 110 updates the LDEV control table T1 stored in the local memory (not illustrated), on the basis of the update results for the LDEV control table T1 stored in the shared memory 140.

FIG. 9 is an illustrative diagram showing a screen for setting write-through flags. The user calls up a parity group management screen such as that shown in FIG. 9(a), selects the parity group to which a desired LDEV belongs, and then presses the destage button B1. Thereby, a list showing the write-through flag setting status for all of the LDEVs belonging to that parity group is displayed on the screen, as illustrated in FIG. 9(b). Here, if the write-through flag is set to "on", then write access is processed by means of a write-through method, and if the write-through flag is set to "off", then write-through is not performed and the write access is processed by means of a write-after method. The write-through flag is information that is referred to in the event of an abnormality which prevents redundant storage in the cache memory 130, and if the cache memory 130 is operating normally, then write access operations are processed by means of a write-after method, regardless of the setting of the write-through flag.

Next, the user selects one or a plurality of desired LDEVs from those displayed, and presses the change button B2. By this means, the write-through flag of the selected LDEV is changed from on to off, or from off to on, as illustrated in FIG. 9(c). More specifically, when the change button B2 is operated, the established value of the write-through flag is inverted. Initially, the write-through flag value is set to "on". Therefore, in the event of an abnormality in the cache memory 130, provided that the write-through flag has not been set to off, a write access operation directed to that LDEV will be processed by means of a write-through method. More specifically, the write data stored in one write cache of the cache memory 130 is written immediately to the LDEV, and when writing to the LDEV has been completed, the completion of the write operation is reported to the host 10.

Figure 10:
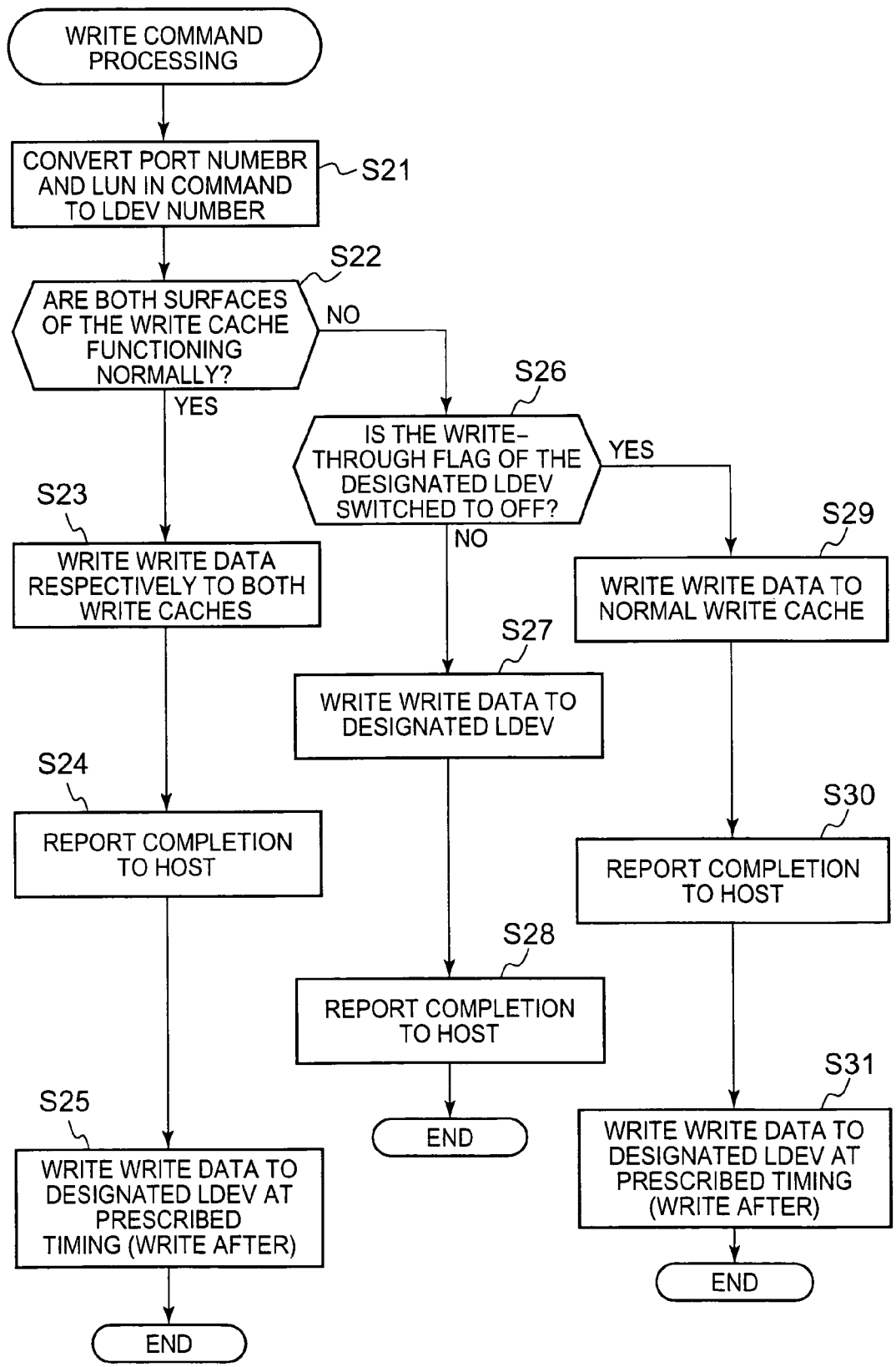
FIG. 10 is a flowchart showing an overview of write access processing.

FIG. 10 is a flowchart showing a general overview of write command processing. This processing comprises three types of write access processing modes, as described below. This processing is executed by either one or both of the CHA 110 and/or the DKA 120.

Firstly, when a write command is received by the CHA 110 from the host 10, the CHA 110 changes the target LDEV number by referring to the LDEV number conversion table T3, on the basis of the port number and the LUN contained in the write command (S21).

Next, the CHA 110 judges whether or not both the cache surface 131 and the NVS surface 132 of the cache memory 130 can be used normally (S22). If both surfaces can be used normally (S22: YES), then a storage area used for storing the write data is set respectively for both surfaces 131 and 132, and the write data received from the host 10 is stored respectively therein (S23). After saving the write data respectively to both the cache surface 131 and the NVS surface 132, the CHA 110 immediately reports the completion of the write operation to the host 10 (S24).

A notification is sent to the DKA 120, via the shared memory 140, for example, indicating that write data has been stored respectively in the cache surface 131 and the NVS surface 132. The DKA 120 reads in the write data from the cache surface 131, and writes the write data to a prescribed disk drive 161 constituting the LDEV to which that write data is to be written (S25). The aforementioned processes from S23 to S25 correspond to a first processing mode (after-write method) for processing write access operations when the cache memory 130 is operating normally (when redundant storage is possible).

On the other hand, if an abnormality occurs in the cache memory 130 and one of the write caches has been closed off (S22: NO), then the CHA 110 refers to the write-through flag established for the LDEV subject to the write access operation, and judges whether or not that write-through flag has been set to off (S26).

If the write-through flag has not been set to off (S26: NO), in other words, if the write-through flag for that LDEV is set to on, then the CHA 110 immediately writes the write data received from the host 10 to the LDEV, by means of the DKA 120 (S27). When the DKA 120 has finished writing to the disk drive 161 constituting the LDEV, the CHA 110 reports the completion of the write operation to the host 10 (S28). The aforementioned processes from S26 to S27 correspond to a second processing mode (write-through mode) for processing write access operations when the cache memory 130 has suffered an abnormality (when redundant storage is not possible).

If an abnormality has occurred in the cache memory, then if the write-through flag for the LDEV subject to write access has been set to "off" (S26: YES), the CHA 110 writes the write data to the write cache that is working normally (S29), and then immediately reports the completion of the write operation to the host 10 (S30). Similarly to the first processing mode, the DKA 120 writes the write data to the prescribed LDEV, asynchronously with respect to the write completion report sent to the host 10 (S31). The aforementioned processes from S29 to S31 correspond to a third processing mode for processing write access operations when the cache memory has suffered an abnormality.

Figure 11:
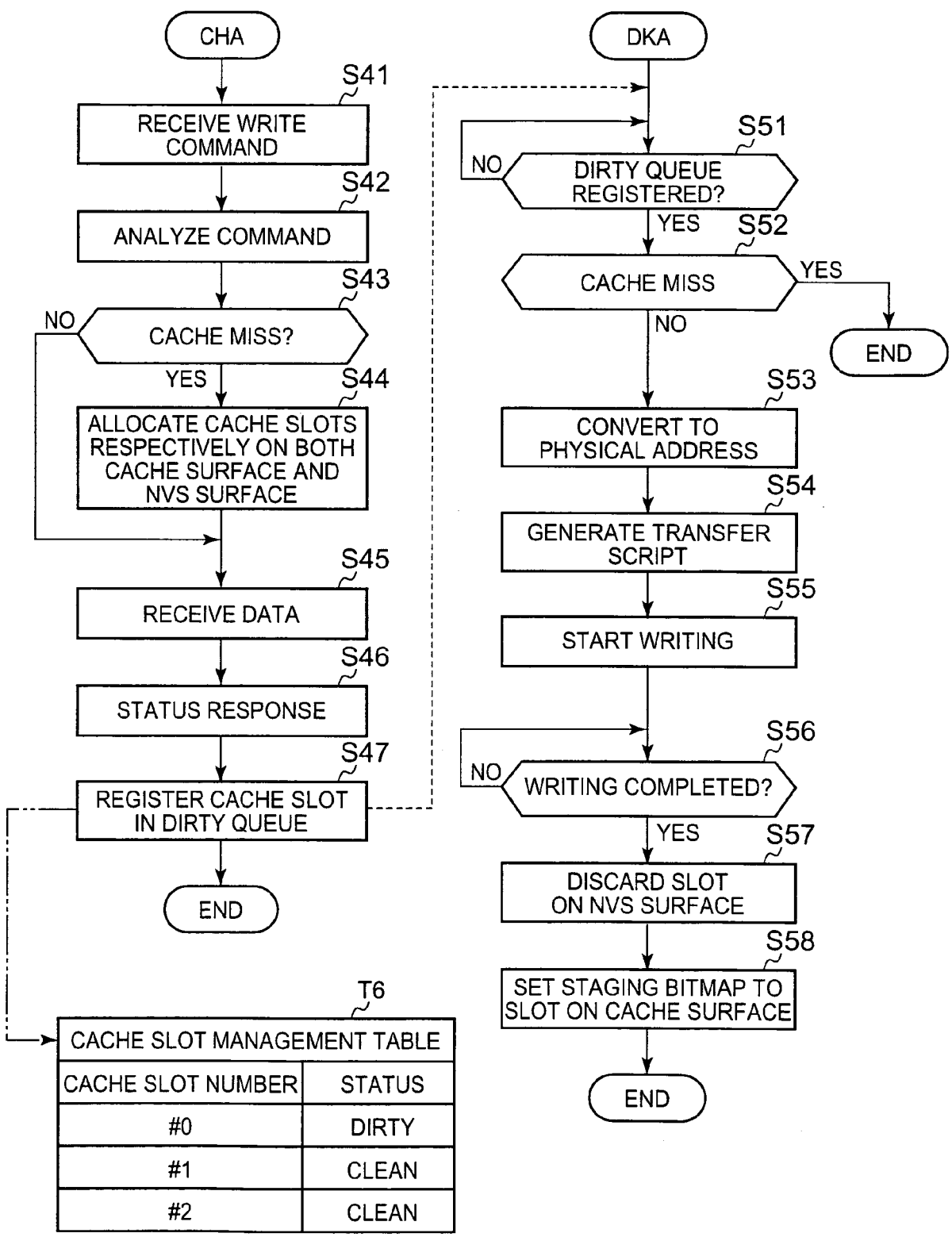
FIG. 11 is a flowchart showing write access processing in a case where the cache memory is in a normal state.

Below, the details of each of the processing modes will be described. FIG. 11 is a flowchart showing the operations in the first processing mode. Firstly, upon receiving a write command from the host 10 (S41), the CHA 110 analyzes this write command (S42), and detects the LDEV number for which writing has been requested. Next, it judges whether or not the data for which writing has been requested is located in the cache memory 130 (S43). In normal circumstances, a cache miss is identified at this point (S43: YES), and the CHA 110 allocates a cache slot corresponding to the required volume, respectively, on both the cache surface 131 and the NVS surface 132 of the cache memory 130 (S44). This cache slot is a storage area for storing the write data.

When preparations for receiving the write data has been completed by allocating a cache slot, the CHA 110 receives the write data from the host 10 and stores it respectively on either surface 131 and 132 (S45). After storing the write data respectively on both surfaces 131 and 132, the CHA 110 reports the completion of the write operation to the host 10 (S46). The CHA 110 registers the cache slot storing the write data in the dirty queue (S47). The status of the cache slot is managed, for example, by means of a cache slot management table T6 stored in the shared memory 140. The cache slot management table T6 may be composed by associating, for example, a cache slot number, and statuses for each cache slot (dirty status, clean status, free status).

Here, a "dirty queue" is a queue for managing cache slots in a state where data has not been written to a disk drive 161. Apart from the dirty queue, there is also, for example, a "clean queue" for managing cache slots whose data has already been copied to a disk drive 161, and a "free queue" for managing unused cache slots.

The status of a cache slot transfers between a dirty status where it is registered in the dirty queue, a clean status where it is registered in the clean queue, and a free status where it is linked to the free queue. For example, when data in a cache slot linked to the dirty queue is written to a disk drive 161, then that cache slot is re-registered in the clean queue and transfers to a clean status. When that cache slot is released, it transfers to a free status. A cache slot in a free state is reused when it is secured for another write access or read access operation.

The DKA 120 refers occasionally to the shared memory 140, and if it discovers an unprocessed cache slot in the dirty queue (S51: YES), then it starts a destage process. A destage process is a process for writing data stored in the cache memory 130, to a prescribed disk drive 161. Firstly, the DKA 120 judges whether or not the write data that is to be destaged is stored in the cache memory 130 (S52). Here, in normal circumstances, a cache hit is identified, but if a cache miss is identified (S52: YES), then this processing sequence ends in an abnormal termination.

If write data that is to be processed has been discovered (S52: NO), then the DKA 120 converts the logical address associated with that write data, to a physical address (S53), and then generates a transfer script (S54). This transfer script is a program for writing the write data received from a host 10, to a prescribed disk drive 161.

By means of this transfer script, the write data starts to be written to the disk drive 161 (S55). When writing to the disk drive 161 has been completed (S56: YES), the DKA 120 discards the NVS surface 132, of the write data managed on both the cache surface 131 and the NVS surface 132 (S57). Thereby, the status of the write data is transferred from a dirty status where it is stored in a redundant fashion, to a clean status where it is stored in a non-redundant fashion.

The DKA 120 establishes a staging bitmap (not illustrated) for the cache slots stored on the cache surface 131, and then terminates the process (S58). Here, a "staging bitmap" is management information indicating that the data is located in the cache memory 130, and it is possible to response swiftly to a read access operation from the host 10 by referring to this staging bitmap.

Figure 12:
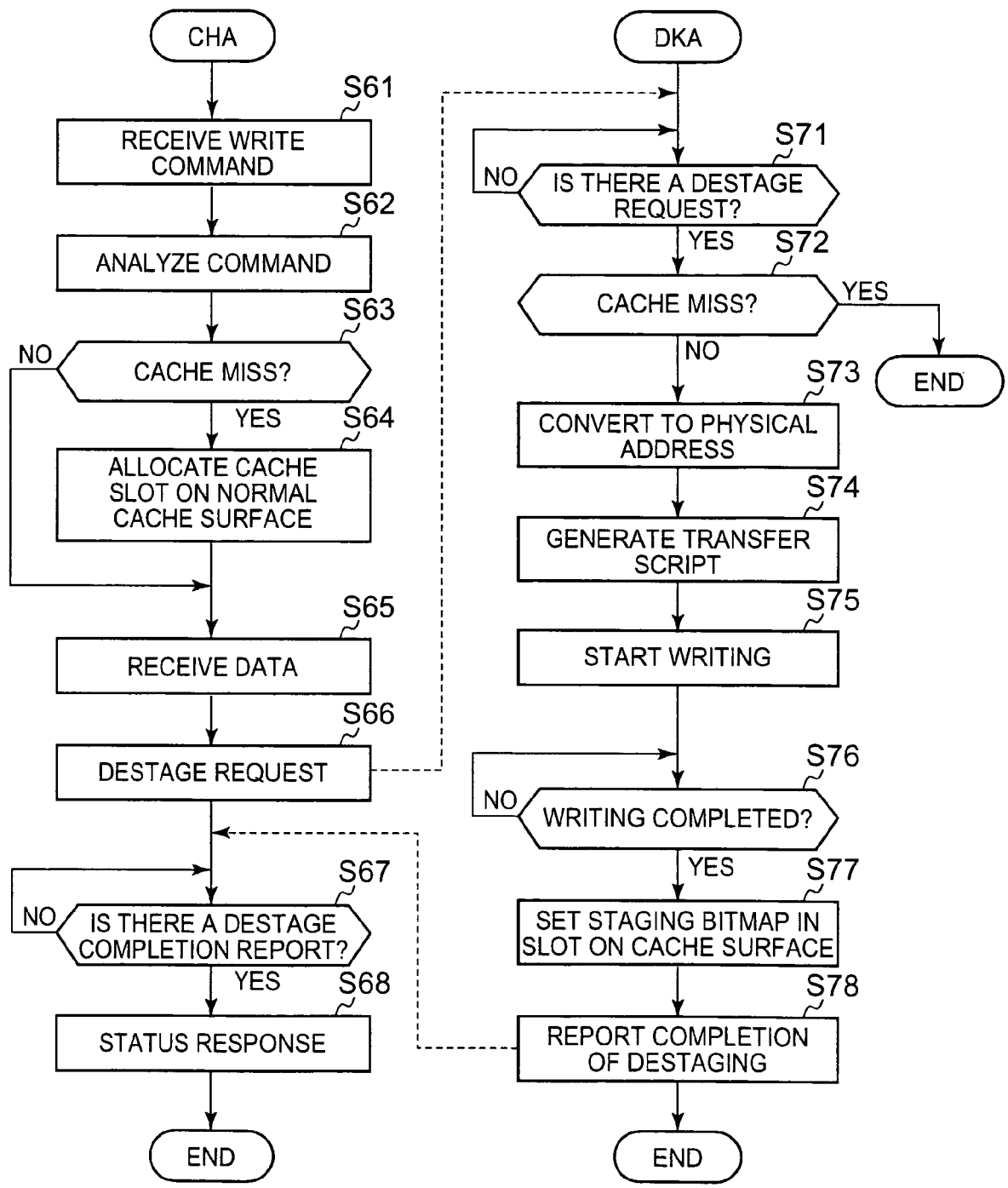
FIG. 12 is a flowchart showing write access processing in a case where an abnormality has occurred in the cache memory.

FIG. 12 is a flowchart showing the operations in the second processing mode. Upon receiving a write command from a host 10 (S61), the CHA 110 analyzes the write command and detects the LDEV number (S62), and judges whether or not a cache miss has resulted (S63).

If a cache miss is identified (S63: YES), then the CHA 110 allocates a cache slot of the required volume, on the cache surface 131 only (S64), and then receives the write data from the host 10 and stores it on the cache surface 131 (S65). After storing the write data in the cache surface 131, the CHA 110 requests destage processing of the DKA 120 (S66).

The CHA 110 waits for the DKA 120 to report completion of the destage process (S67), and when it has confirmed completion of the destage process (S67: YES), it reports the completion of the write operation to the host 10 (S68).

When the CHA 110 has issued a destage request (S71 YES), the DKA 120 starts destage processing. More specifically, in the second processing mode, the start of the destage process and the sending of the write completion report to the host 10 are performed simultaneously.

Firstly, the DKA 120 judges whether or not there has been a cache miss (S72), and if write data to be processed is discovered (S72: NO), then the DKA 120 converts the logical address of that write data to a physical address (S73) and generates a transfer script (S74).

By means of this transfer script, the operation of writing the write data to the disk drive 161 is started (S75), and when writing to the disk drive 161 has been completed (S76: YES), then the DKA 120 establishes a staging bitmap for the cache slots stored on the cache surface 131 (S77). The DKA 120 reports to the CHA 110 that the destage processing has been completed (S78).

Figure 13:
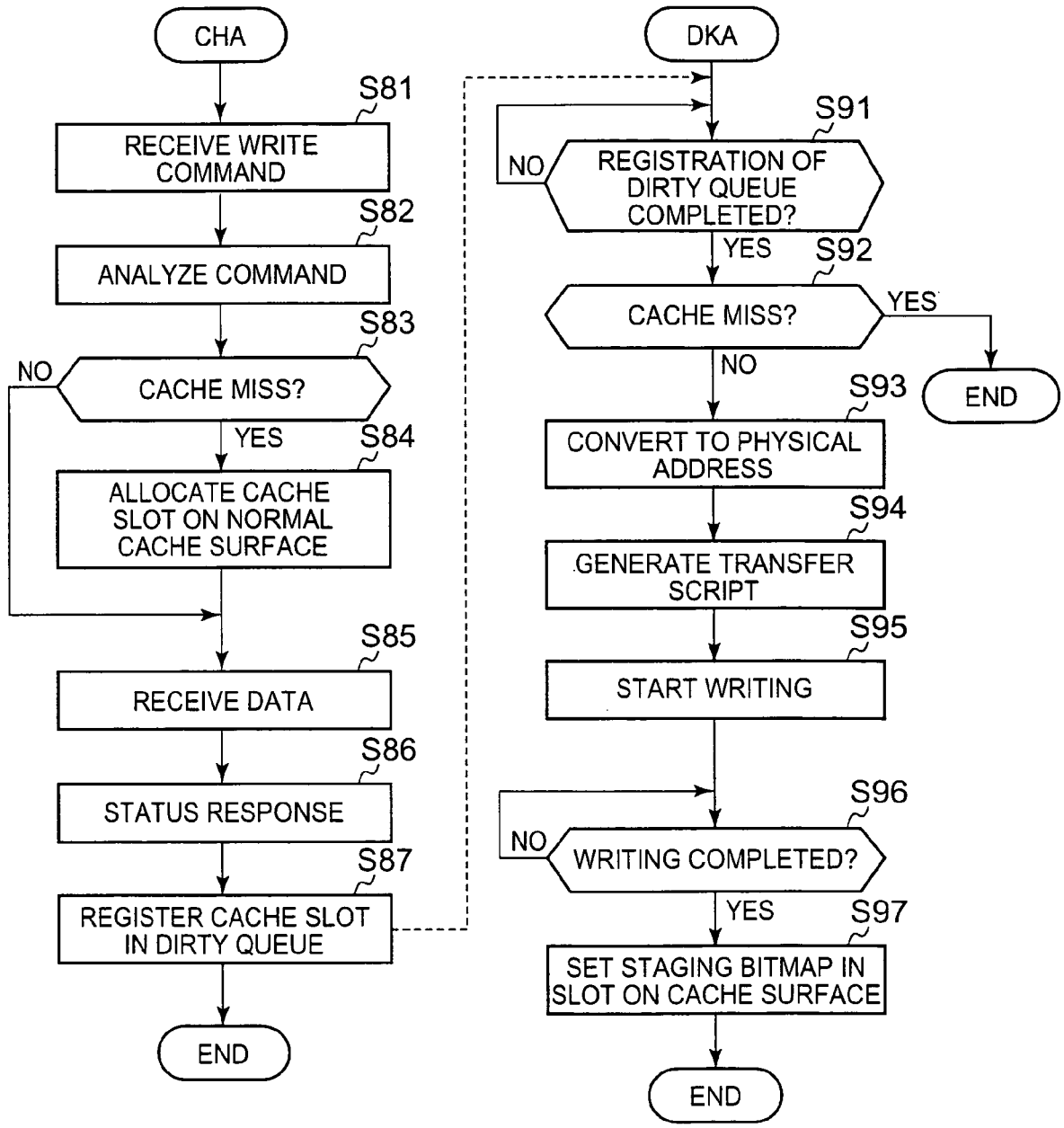
FIG. 13 is a flowchart showing further write access processing in a case where an abnormality has occurred in the cache memory.

FIG. 13 is a flowchart showing the operations in the third processing mode. The third processing mode involves the same processing as the first processing mode. However, several steps differ from the first processing mode, because the completion of the write operation is reported to the host 10 when the write data has been stored in the write cache of one surface only.

Upon receiving a write command from the host 10 (S81), the CHA 110 analyzes this write command (S82), and detects the LDEV number for which writing has been requested. Thereupon, the CHA 110 judges whether or not there has been a cache miss (S83), and it then allocates a cache slot of the required volume, on the cache surface 131 only (S84).

The CHA 110 then receives the write data from the host 10 and stores it on the cache surface 131 (S85), whereupon it reports completion of the write operation to the host 10

(S86). The CHA 110 registers the cache slot storing the write data in the dirty queue (S87).

If the DKA 120 discovers an unprocessed cache slot in the dirty queue (S91: YES), then it starts a destage process. The DKA 120 judges whether or not the write data to be destaged is stored in the cache memory 130 (S92), and if it discovers write data that is to be processed (S92: NO), then it converts the logical address associated with that write data, to a physical address (S93), and then generates a transfer script (S94).

By means of this transfer script, the write data starts to be written to the disk drive 161 (S95). When writing to the disk drive 161 has been completed (S96: YES), the DKA 120 establishes a staging bitmap for the cache slots stored on the cache surface 131, and then terminates the process (S97).

Figure 14:
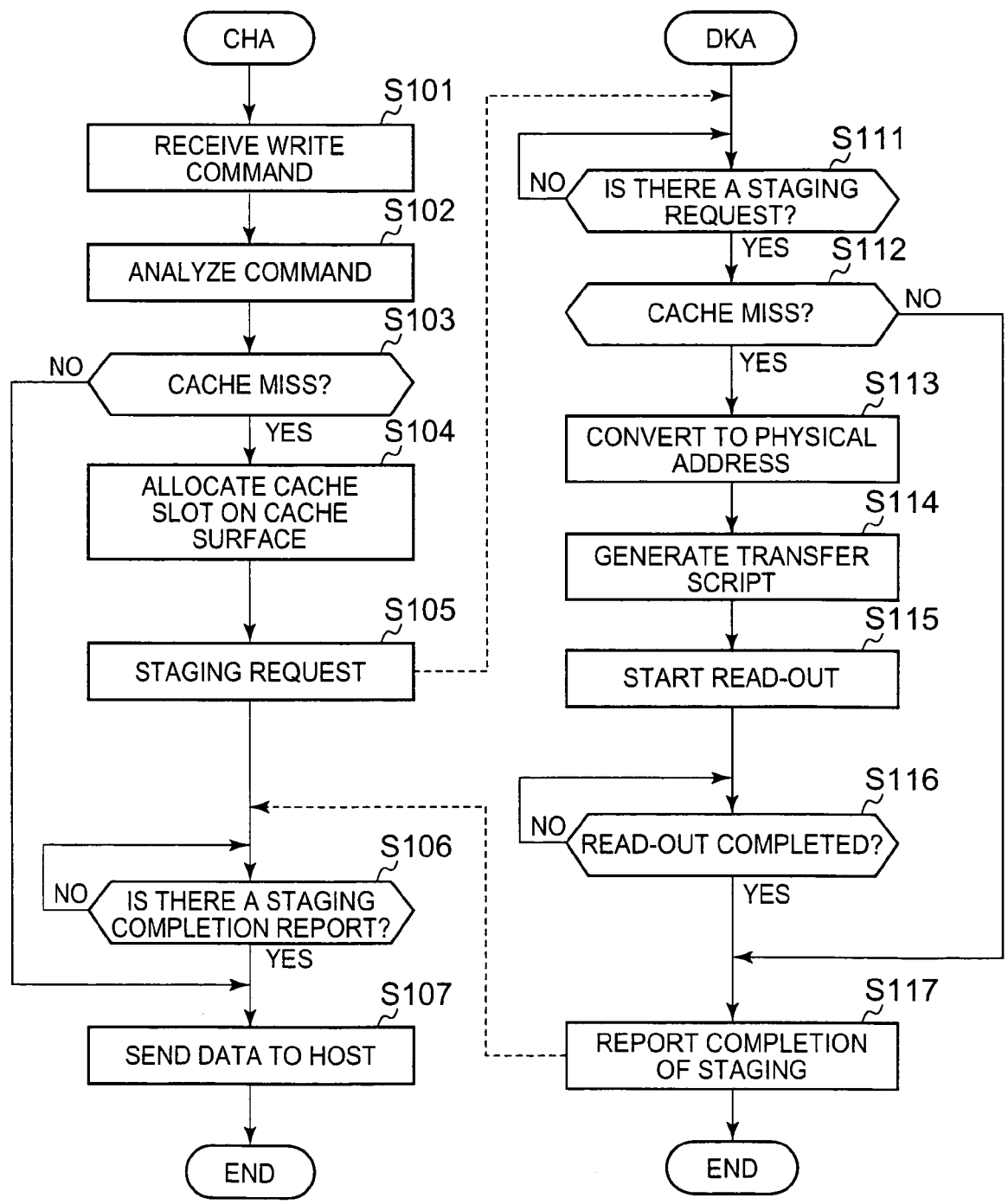
FIG. 14 is a flowchart showing read access processing.

FIG. 14 is a flowchart showing processing in a case where the host 10 performs a read access operation. Firstly, upon receiving a read command from the host 10 (S101), the CHA 110 analyzes that read command (S102), and then judges whether or not the data which has been requested in the read out command is located in the cache memory 130, by referring to the staging bitmap (S103).

If the requested data is already stored in the cache memory 130 (S103: NO), then the CHA 110 reads out that data and sends it to the host 10 (S107). If the requested data is not stored in the cache memory 130 (S103: YES), then the CHA 110 allocates a cache slot on the cache surface 131 in order to store data read out from the disk drive 161 (S104), and it then requests the DKA 120 to start a staging process (S105). The staging process is a process for reading out prescribed data from a disk drive 161 and storing it in the cache memory 130.

The CHA 110 waits for a staging process completion report from the DKA 120 (S106), and if it confirms that the staging process has been completed (S106: YES), then it reads out the data stored on the cache surface 131 and sends the data to the host 10 (S107).

On the other hand, upon receiving a staging request from the CHA 110 (S111: YES), the DKA 120 judges whether or not the read data thus requested is located in the cache memory 130. If the read data is not located in the cache memory 130 (S112: YES), then the DKA 120 converts the logical address of the requested read data to a physical address (S113), and then generates a transfer script for data read-out (S114). On the basis of this transfer script, read data is read out from the prescribed disk drive 161 (S115), and the data thus read out is stored on the cache surface 131. When read out of the requested read data has been completed (S116: YES), the DKA 120 reports to the CHA 110 that the staging process has been completed (S117).

By adopting the composition described above, the present embodiment has the following beneficial effects. Since respectively different write access processing modes can be set independently for each LDEV, it is possible to achieve flexible processing in accordance with the use configuration of the respective LDEVs and the adopted storage policy, and the like, and therefore usability is improved.

Furthermore, a composition is adopted wherein, if the cache memory 130 is functioning normally, then the first processing mode is used respectively for all of the LDEVs, whereas if an abnormal state occurs in the cache memory 130, then either a second processing mode or a third processing mode is used, depending on a write-through flag. Consequently, when the cache memory 130 is functioning normally, it is possible to achieve both protection against data loss together with good accessibility, whereas when the cache memory 130 is functioning abnormally, the user can choose freely whether to increase protection against data loss or to seek to maintain performance of write access operations, as appropriate, and hence usability is improved.

Moreover, since the second processing mode is selected as an initial value of the write-through flag, then it is possible to avoid occurrence of data loss and hence improve reliability, unless the user explicitly selects otherwise. For example, if a data movement event occurs without an accompanying movement of attributes, such as data migration, volume copying, or the like, then it is possible to increase reliability by setting the write-through flag for that volume (LDEV) to an initial value.

2. Second Embodiment

Figure 16:
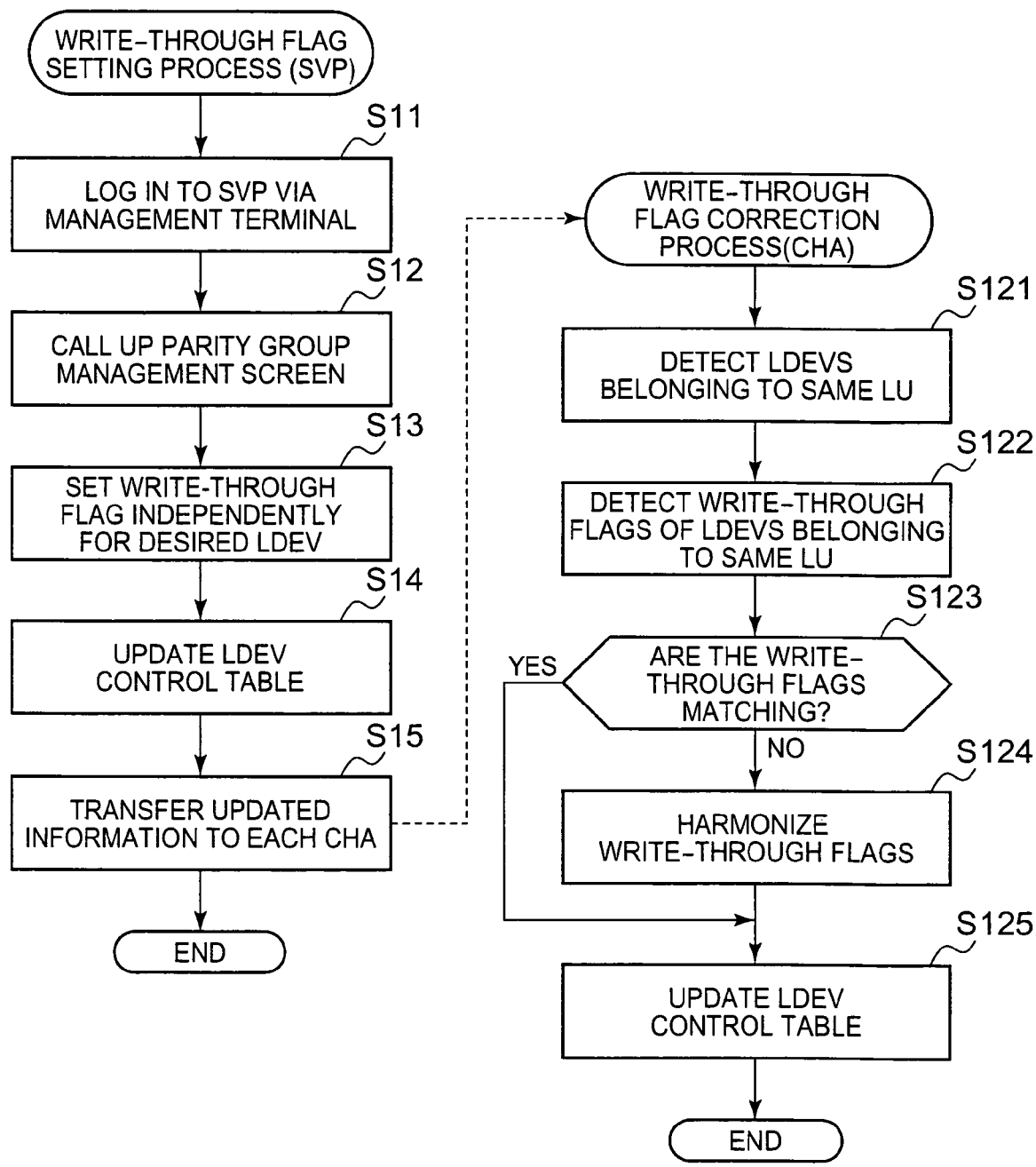
FIG. 16 is a flowchart of the setting and correction of a write-through flag.
Figure 17:
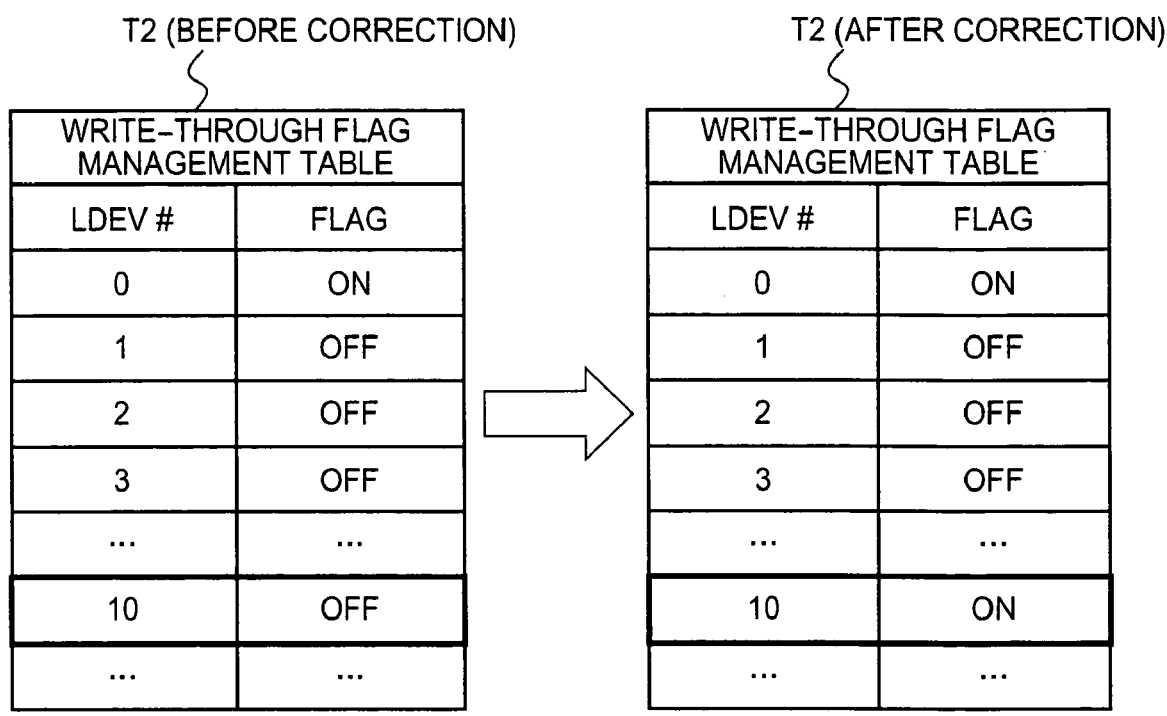
FIG. 17 is an illustrative diagram showing a situation where mutually related write-through flags are corrected together.

A second embodiment of the present invention is now described on the basis of FIG. 15 to FIG. 17. The respective embodiments described below correspond to modifications of the first embodiment. The characteristic feature of this embodiment lies in the fact that when the processing mode is changed for any one LDEV of the plurality of LDEVs constituting one LU, the processing modes for the other LDEVs are also changed automatically.

As shown by the LDEV number conversion table T3 in FIG. 15, one LU "#0" is constituted by two LDEVs, LDEV "#0" and LDEV "#10", for example. FIG. 16 is a flowchart showing a write-through flag setting process and correcting process. In the present embodiment, when the write-through flag of a prescribed LDEV is changed by means of the SVP 170, the write-through flags of the other LDEVs related to that LDEV are also changed automatically by the CHA 110.

The processing in S11-S15 has already been described and hence further description thereof is omitted here, but in this processing, the user sets a write-through flag for a desired LDEV. The prescribed CHA 110 detects the LDEVs forming the same LU (S121). The CHA 110 detects the write-through flags of the related LDEVs (S122), and judges whether or not the write-through flags of the related LDEVs are matching (S123).

For example, if the write-through flag set for one LDEV of the LDEV group constituting the same LU is different to the write-through flag set for another LDEV (S123: NO), then the write-through flags of the group of related LDEVs are harmonized by changing the write-through flag of the other LDEV (S124). For example, the newest write-through flag is prioritized on the basis of the time at which a write-through flag was last changed, and the other write-through flags are corrected so as to have the same value as the newest write-through flag. If the write-through flags of the group of related LDEVs are matching (S123: YES), then the correction process in S124 is skipped. The CHA 110 then respectively updates the LDEV control tables T1 stored in the shared memory 140 and the local memory (S125).

FIG. 17 is an illustrative diagram showing a situation where the write-through flags of mutually related LDEVs are corrected by the CHA 110. As shown on the left-hand side of FIG. 17, if the user sets the write-through flag of LDEV "#0" to "on", via the SVP 170, then the CHA 110 sets the write-through flag of that LDEV "#0" and the write-through flags of the other LDEVs "#10" constituting the same LU, to "on", as shown on the right-hand side of FIG. 17.

According to the present embodiment, a composition is achieved wherein even if the user has changed a write-through flag for one LDEV of a plurality of LDEVs belonging to the same LU, the write-through flags of the other LDEVs forming the same LU are changed automatically, together with that of the LDEV in question. Consequently, if an abnormality has occurred in the cache memory 130, it is possible to use the respective LDEVs belonging to the same LU by means of the same processing mode. Furthermore, the user is able to set the write-through flags freely in LDEV units, without being aware of the composition of the LU, and hence usability is improved.

3. Third Embodiment

Figure 18:
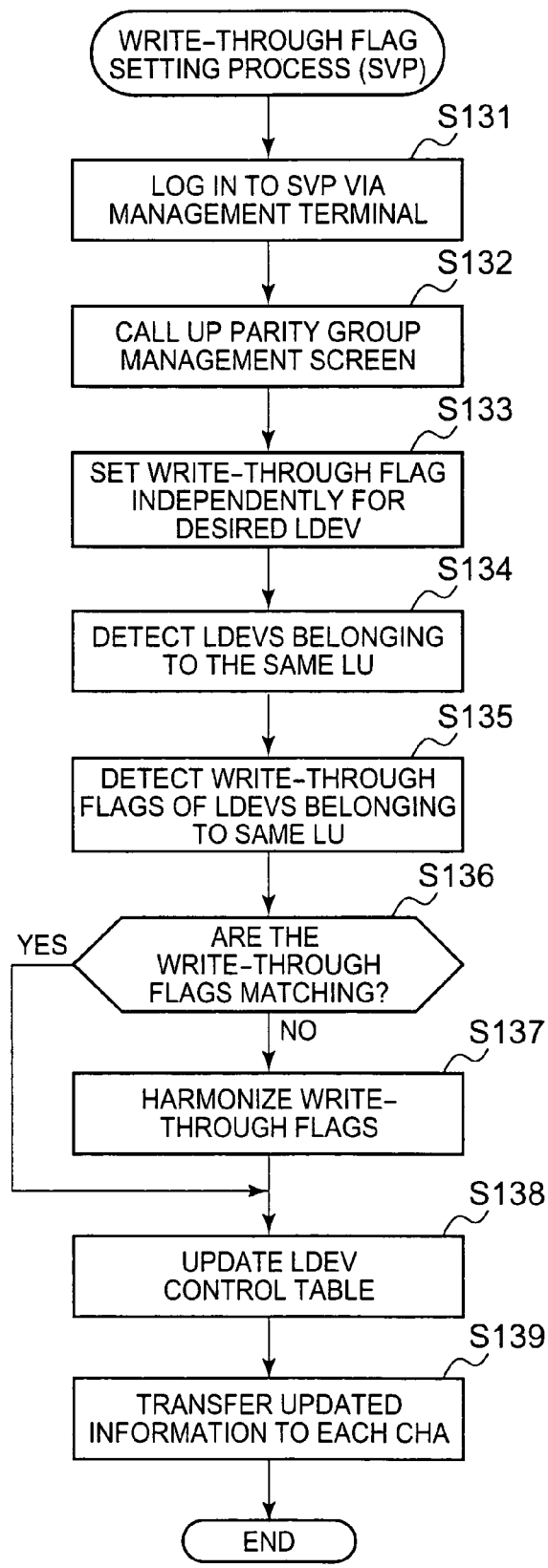
FIG. 18 is a flowchart showing a write-through flag setting process used in a third embodiment.

FIG. 18 is a flowchart showing a write-through flag setting process relating to a third embodiment of the present invention. In the present embodiment, the operations of setting and correcting the write-through flags are both executed by the SVP 170.

More specifically, a user logs in to the SVP 170 via the management terminal 30 (S131), calls up a parity group management screen (S132), and sets a write-through flag independently, for a desired LDEV (S133).

When the user has finished setting the write-through flag, the SVP 170 detects the LDEVs belonging to the same LU (S134), and examines whether or not the write-through flags of the group of mutually related LDEVs are matching (S135). If the write-through flags of the group of related LDEVs are not matching (S136: NO), then the SVP 170 harmonizes the write-through flags by means of a similar method to that described in the previous embodiment (S137). As stated in the first embodiment, the SVP 170 updates the LDEV control table T1 (S138), and it transfers the updated information respectively to each of the CHAs 110 (S139).

4. Fourth Embodiment

Figure 19:
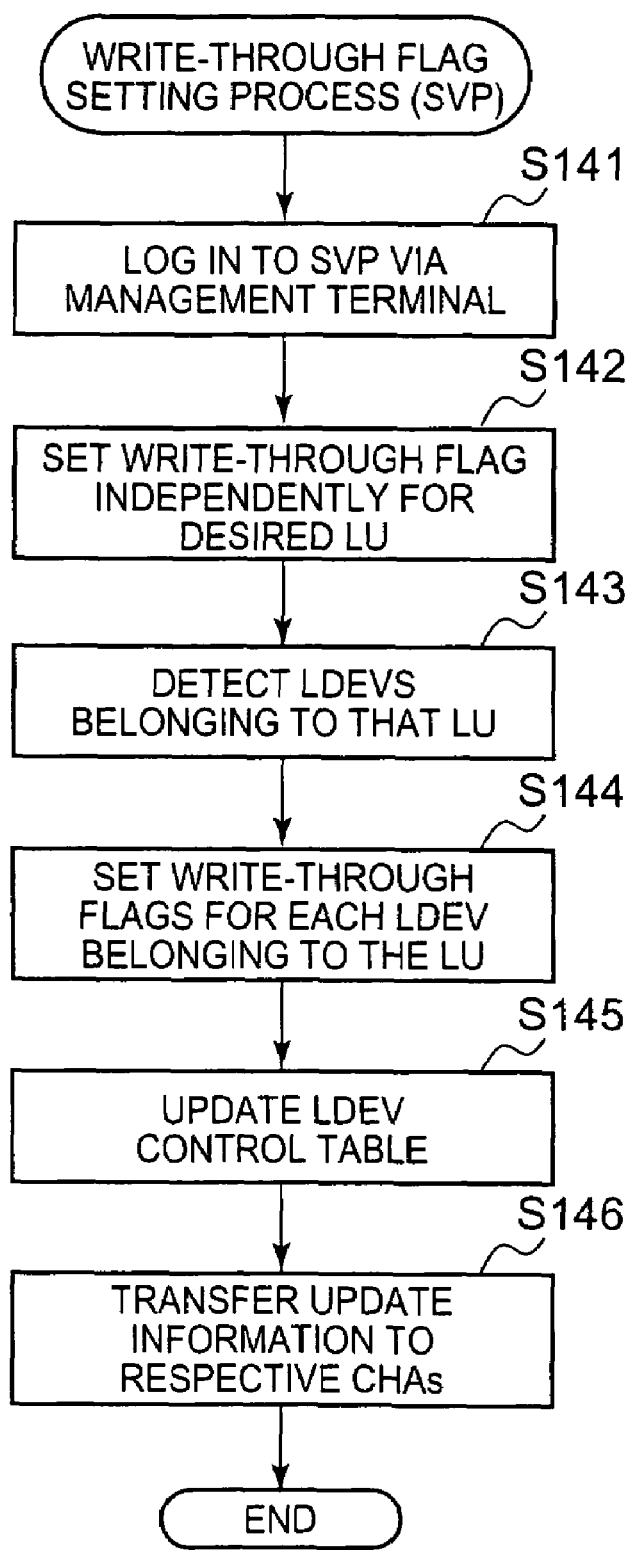
FIG. 19 is a flowchart showing a write-through flag setting process used in a fourth embodiment.
Figure 20:
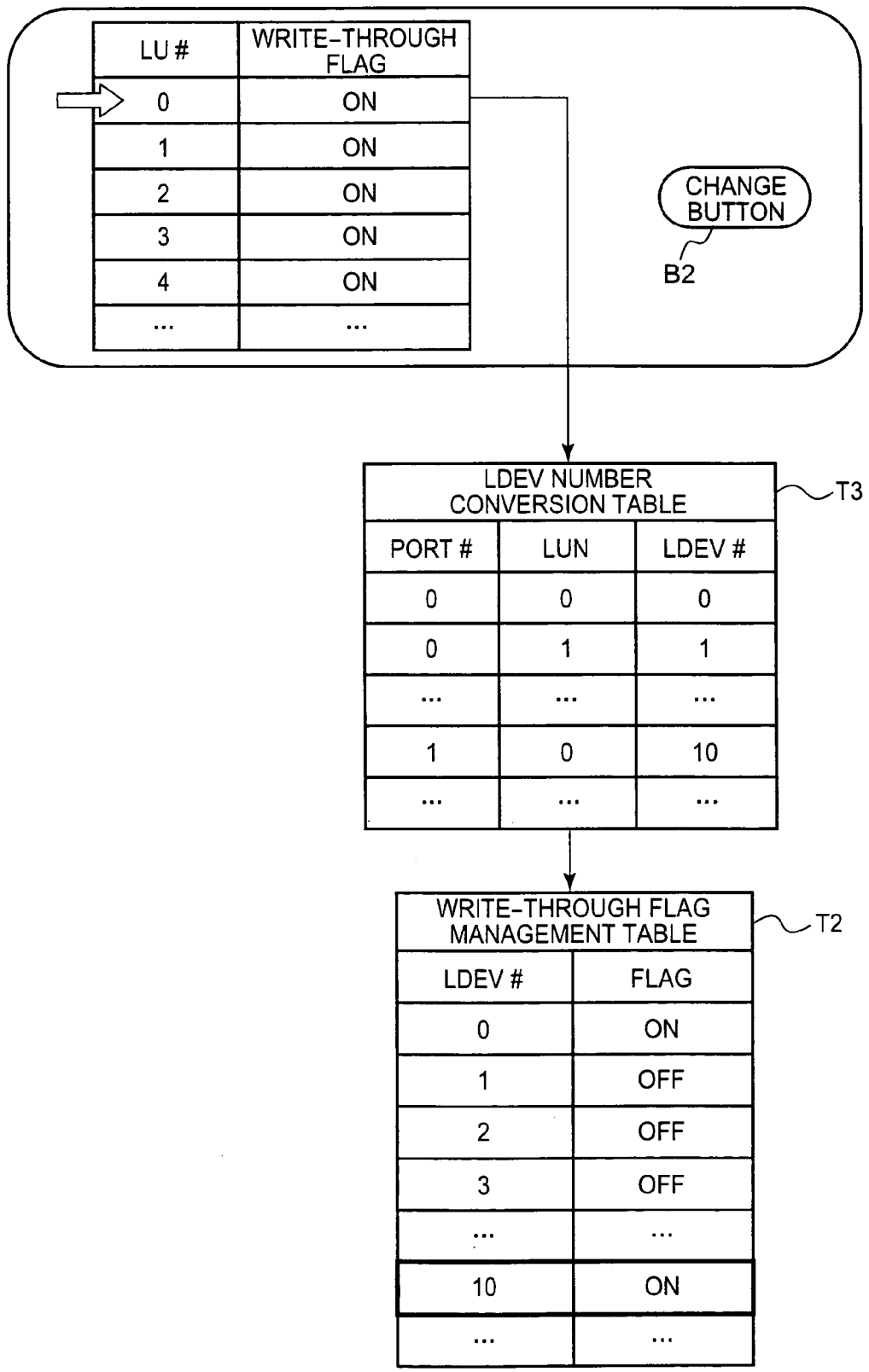
FIG. 20 is an illustrative diagram showing an example of a screen for setting a write-through flag for individual LUs.

A fourth embodiment is now described on the basis of FIG. 19 and FIG. 20. In this embodiment, the processing mode used for write access is set independently for each LU.

The user logs in to the SVP 170 via the management terminal 30 (S141), calls up the write-through flag setting screen as illustrated in the upper portion of FIG. 20, and sets a write-through flag for a desired LU (S142) By referring to the LDEV number conversion table T3, for example, the SVP 170 detects the respective LDEVs belonging to the LU for which the user has set (or changed) the write-through flag (S143). The SVP 170 then changes the write-through flags of all of the LDEVs belonging to that LU, as illustrated by the write-through flag management table T2 in the lower part of FIG. 20, for example (S144). The write-through flag management table T2 is used in order to facilitate the description, and the SVP 170 is actually able directly to change the write-through flags in the respective LDEV control tables T1 managing the respective LDEVs belonging to the LU (S145). The SVP 170 then transfers the updated information respectively to each of the CHAs 110 (S146).

5. Fifth Embodiment

Figure 21:
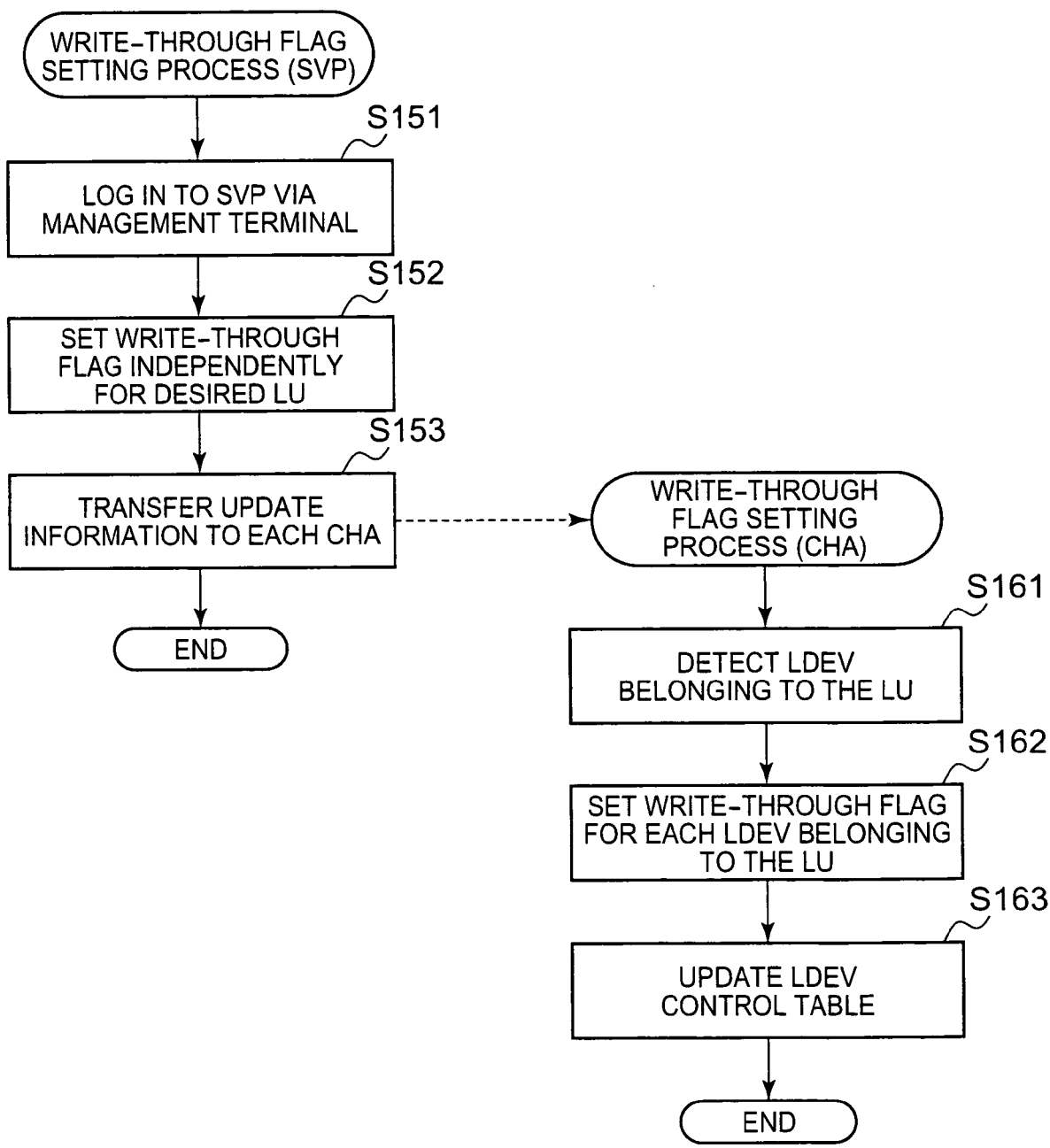
FIG. 21 is a flowchart showing a write-through flag specifying and setting process used in a fifth embodiment.

FIG. 21 is a flowchart of a write-through flag setting process relating to a fifth embodiment. In this embodiment, the user sets the processing mode for each LU by means of the SVP 170, and the write-through flags of each of the LDEVs belonging to that LU are changed by the CHA 110.

The user logs in to the SVP 170 from the management terminal 30 (S151), and sets a write-through flag independently for a desired LU (S152). The SVP 170 transfers the updated information respectively to each of the CHAs 110 (S153).

One prescribed CHA 110 of the respective CHAs 110 detects the LDEVs belonging to the LU for which the write-through flag has been changed (S161), changes the write-through flags for each of the LDEVs thus detected (S162), and then updates the LDEV control table T1 (S163) In this way, apparently, write-through flags are set independently for a LU unit, but in actual fact, the write-through flags of each of the LDEVs belonging to that LU are changed. By structuring the apparent units for which write-through flags are set and the actual units for which the write-through flags are set in different layers in this manner, usability is further improved.

6. Sixth Embodiment

Figure 22:
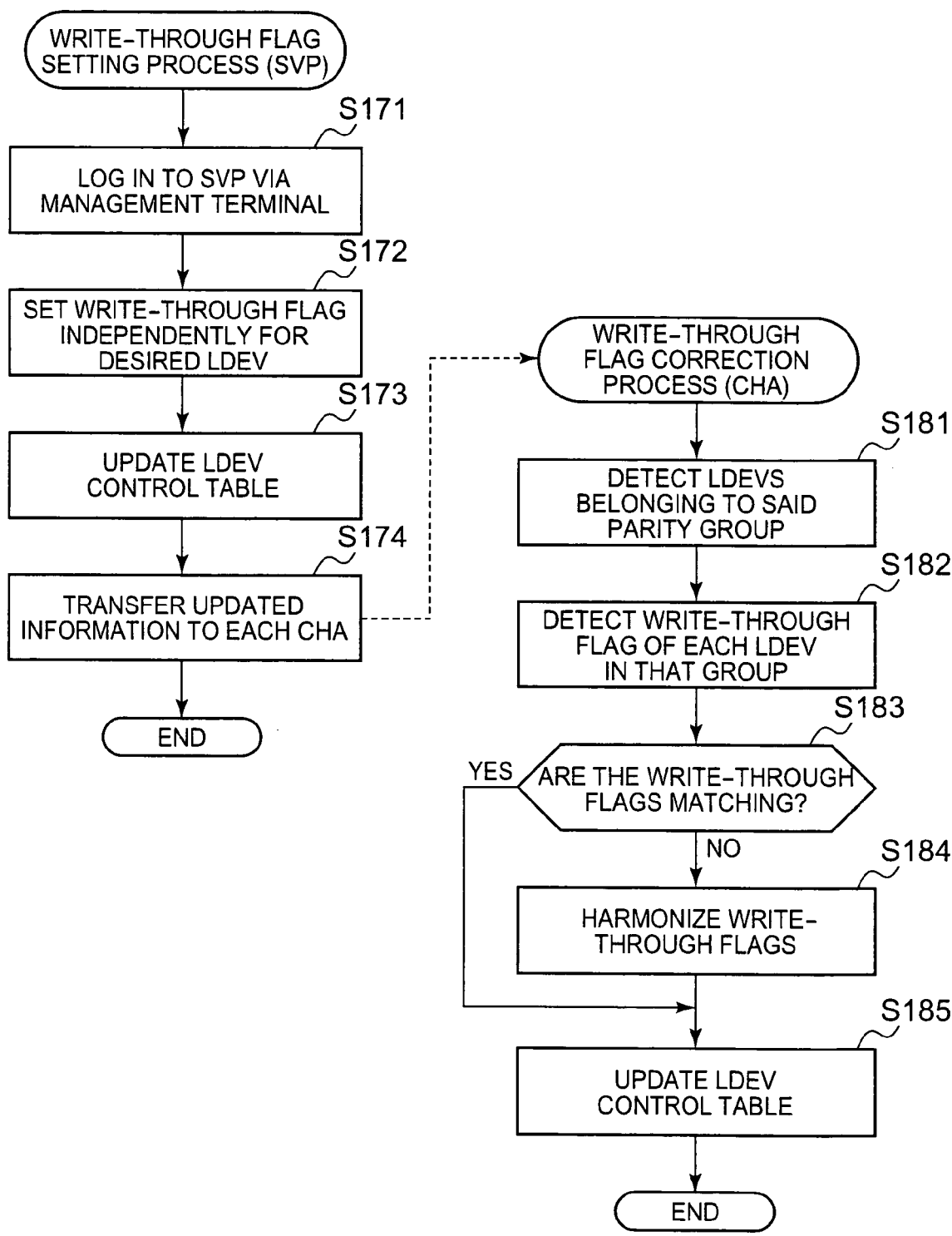
FIG. 22 is a flowchart showing a write-through flag setting process and correcting process used in a sixth embodiment.
Figure 23:
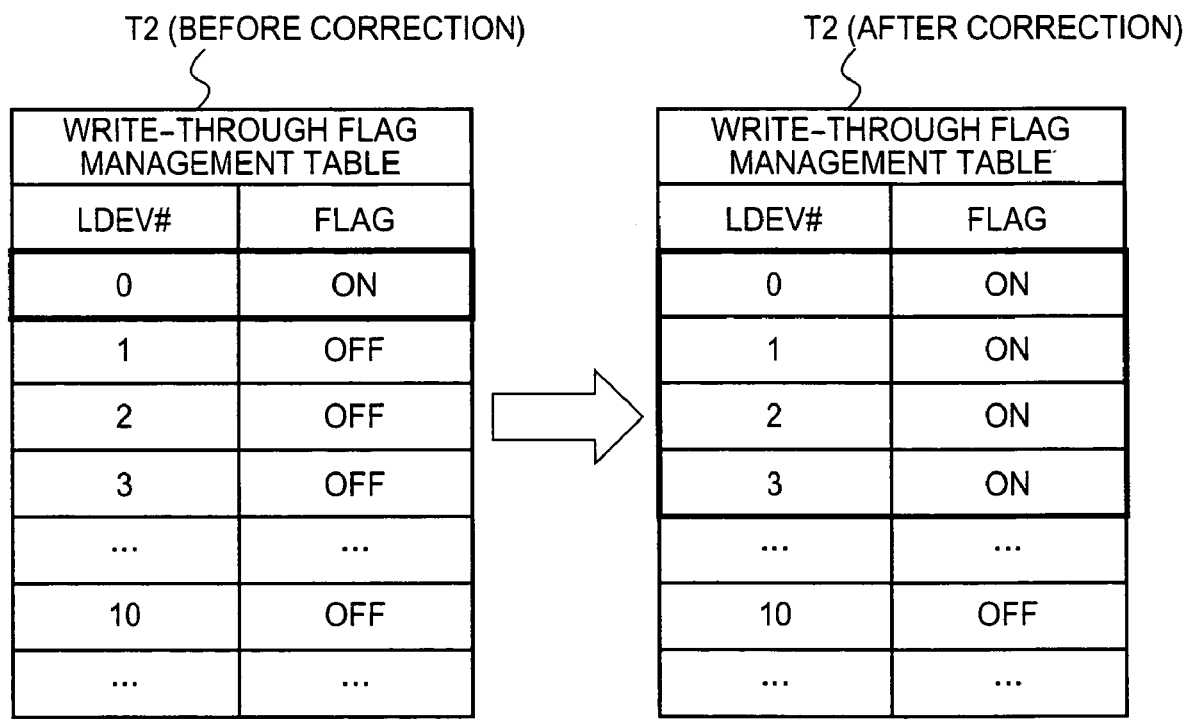
FIG. 23 is an illustrative diagram showing a situation where mutually related write-through flags are corrected together.

A sixth embodiment is now described on the basis of FIG. 22 and FIG. 23. In this embodiment, if a write-through flag is changed in a particular LDEV, then the write-through flags of the other LDEVs belonging to the same parity group as that LDEV are changed automatically to match the changed write-through flag.

The user logs in to the SVP 170 from the management terminal 30 (S171), and sets (changes) a write-through flag for a desired LDEV (S172). The SVP 170 updates the LDEV control table T1 (S173), and it transfers the updated information respectively to each of the CHAs 110 (S174).

Upon detecting that the LDEV control table T1 has been updated, a prescribed CHA 110 detects all of the LDEVs belonging to the same parity group as the LDEV whose write-through flag has been updated (S181). The CHA 110 detects the write-through flags of the respective LDEVs belonging to the same parity group and judges whether or not the respective flags are matching (S183), and if flags are not matching (S183: NO), then the respective write-through flags in that same parity group are harmonized, as illustrated in FIG. 23. (S184) The CHA 110 updates the LDEV control table T1 and then terminates the process (S185).

FIG. 23 shows a case where LDEVs "#0"-"#3" belong respectively to the same parity group, and when the write-through flag of LDEV "#0" is set to "on", the write-through flags of all of the other LDEVs "#1"-"#3" are also set to "on".

7. Seventh Embodiment

Figure 24:
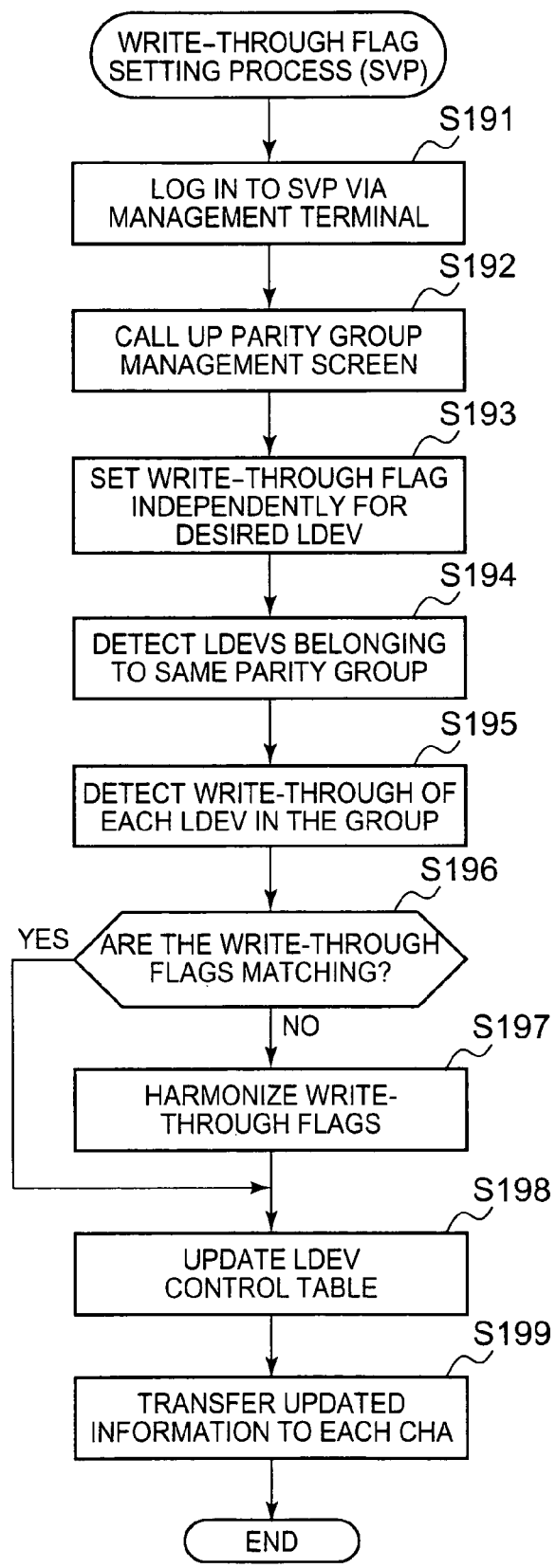
FIG. 24 is a flowchart of a write-through flag setting process used in a seventh embodiment.

A seventh embodiment is now described on the basis of FIG. 24. In this embodiment, the write-through flags of each of the LDEVs belonging to the same parity group are harmonized in the SVP 170.

A user logs in to the SVP 170 via the management terminal 30 (S191), calls up a parity group management screen (S192), and sets (changes) a write-through flag for a desired LDEV (S193). The SVP 170 detects all of the LDEVs belonging to the same parity group as the LDEV whose write-through flag has been updated (S194), and it detects the respective write-through flags set for those LDEVs (S195).

The SVP 170 judges whether or not the detected write-through flags are matching (S196), and if the flags are not matching (S196: NO), then each write-through flag of that parity group is harmonized (S197). The SVP 170 updates the LDEV control table T1 (S198), and it transfers the updated information respectively to each of the CHAs 110 (S199).

8. Eighth Embodiment

Figure 25:
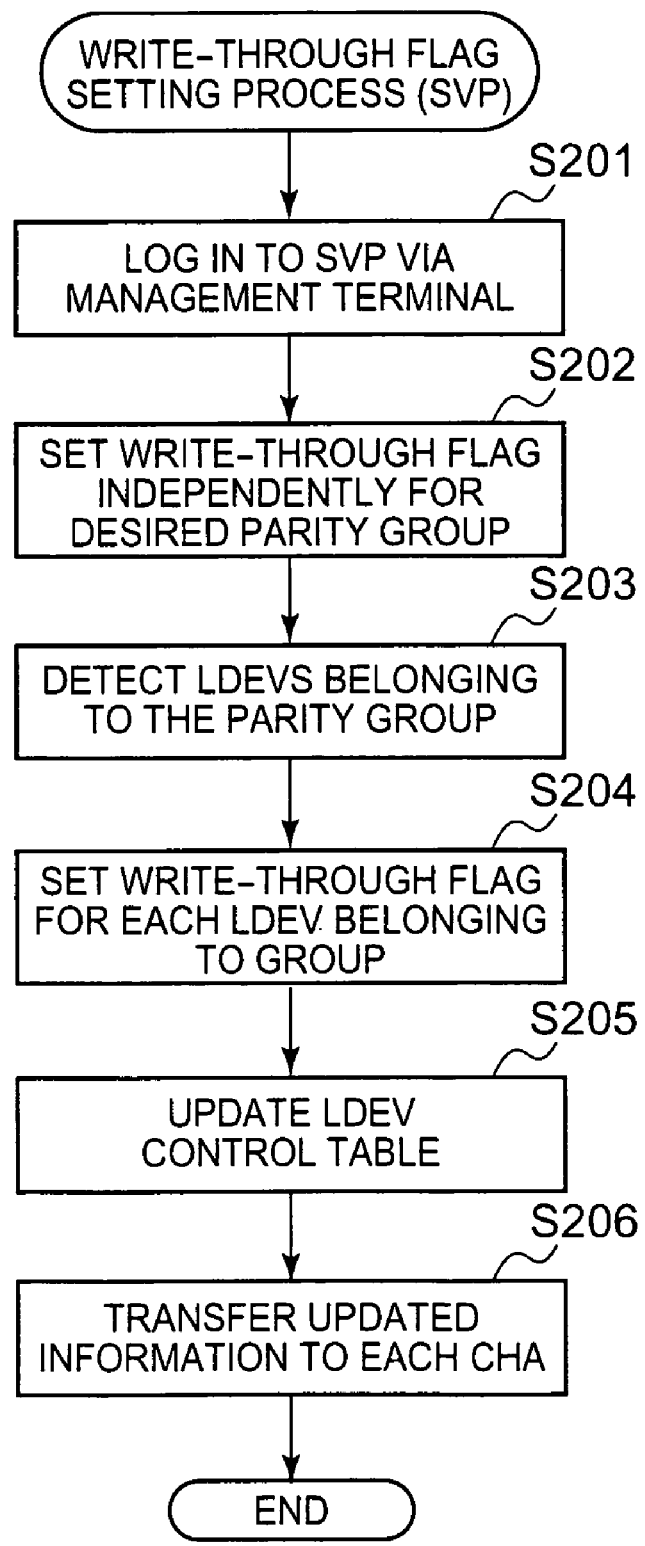
FIG. 25 is a flowchart of a write-through flag setting process used in an eighth embodiment.
Figure 26:
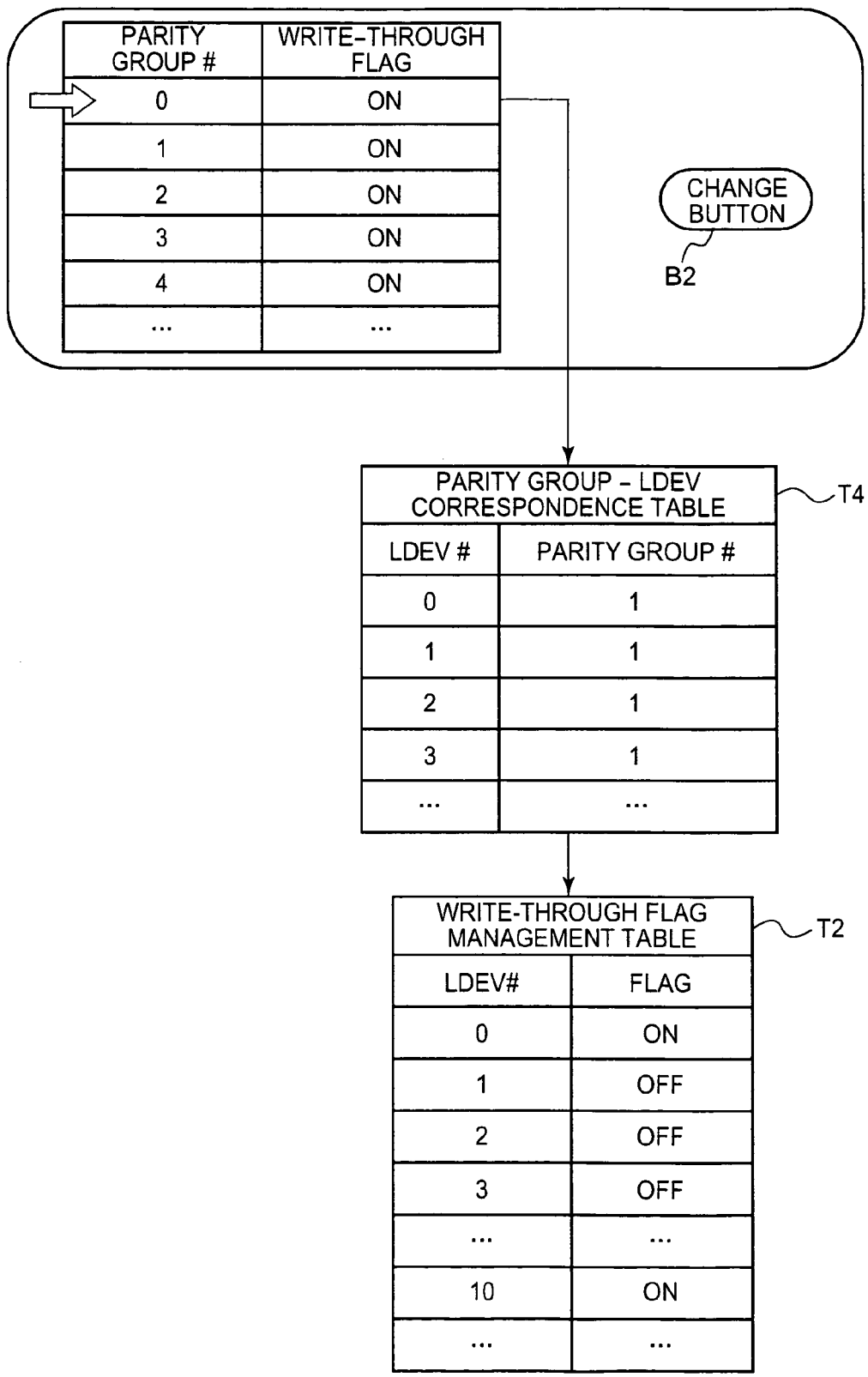
FIG. 26 is an illustrative diagram showing an example of a screen for setting a write-through flag for individual parity groups.

An eighth embodiment is now described on the basis of FIG. 25 and FIG. 26. In this embodiment, the processing mode for write access operations can be set independently in parity group units. FIG. 25 is a flowchart showing a write-through flag setting process according to the present embodiment.

The user logs in to the SVP 170 via the management terminal 30 (S201), calls up the write-through flag setting screen as illustrated in the upper portion of FIG. 26, and sets a write-through flag for a desired parity group (S202).

By referring to the parity group—LDEV correspondence table T4, for example, the SVP 170 respectively detects all of the LDEVs belonging to the parity group for which the user has set (or changed) the write-through flag (S203).

The SVP 170 then changes the write-through flags of all of the LDEVs belonging to that parity group, as illustrated by the write-through flag management table T2 in the lower part of FIG. 26, for example (S204). The SVP 170 updates the write-through flags in the respective LDEV control tables T1 managing the respective LDEVs belonging to that parity group (S205), and then transfers the updated information respectively to the CHAs 110 (S206).

9. Ninth Embodiment

Figure 27:
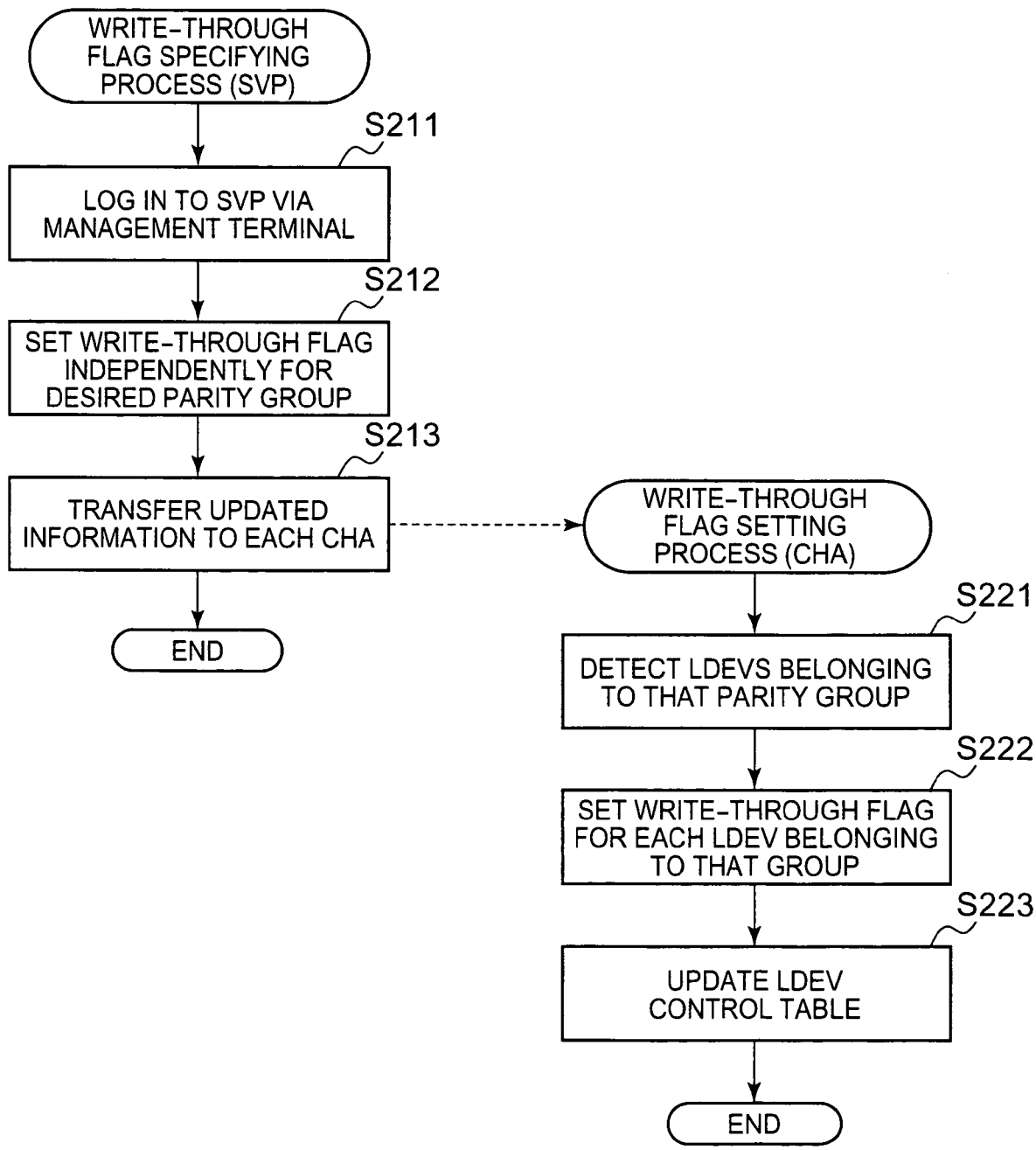
FIG. 27 is a flowchart of a write-through flag setting process used in a ninth embodiment.

FIG. 27 is a flowchart of a write-through flag setting process relating to a ninth embodiment. In this embodiment, the user specifies the processing mode for each parity group by means of the SVP 170, and the write-through flags of each of the LDEVs belonging to that parity group are changed by the CHA 110.

The user logs in to the SVP 170 from the management terminal 30 (S211), and sets a write-through flag independently for a desired LU (S212). The SVP 170 transfers the updated information respectively to each of the CHAs 110 (S213).

A prescribed CHA 110 detects the LDEVs belonging to the parity group for which the write-through flag has been changed (S221), changes the write-through flags for each of the LDEVs thus detected (S222), and then updates the LDEV control table T1 (S223).

10. Tenth Embodiment

Figure 28:
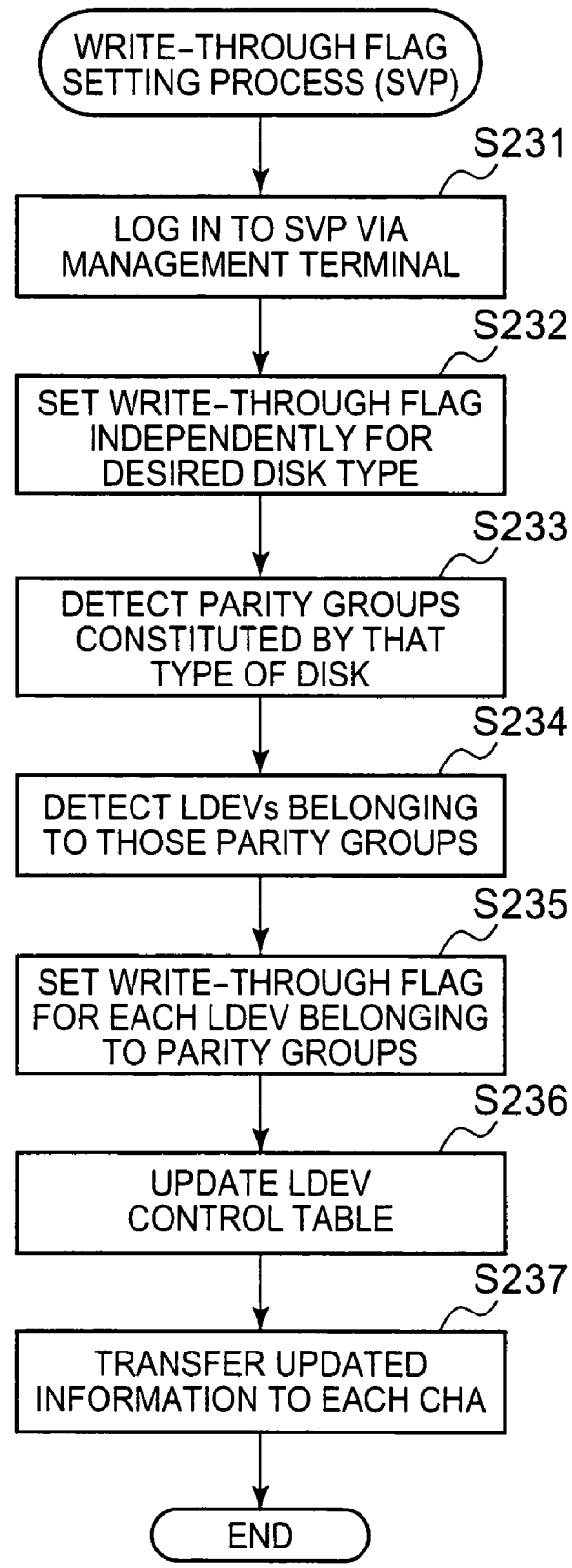
FIG. 28 is a flowchart of a write-through flag setting process used in a tenth embodiment.
Figure 29:
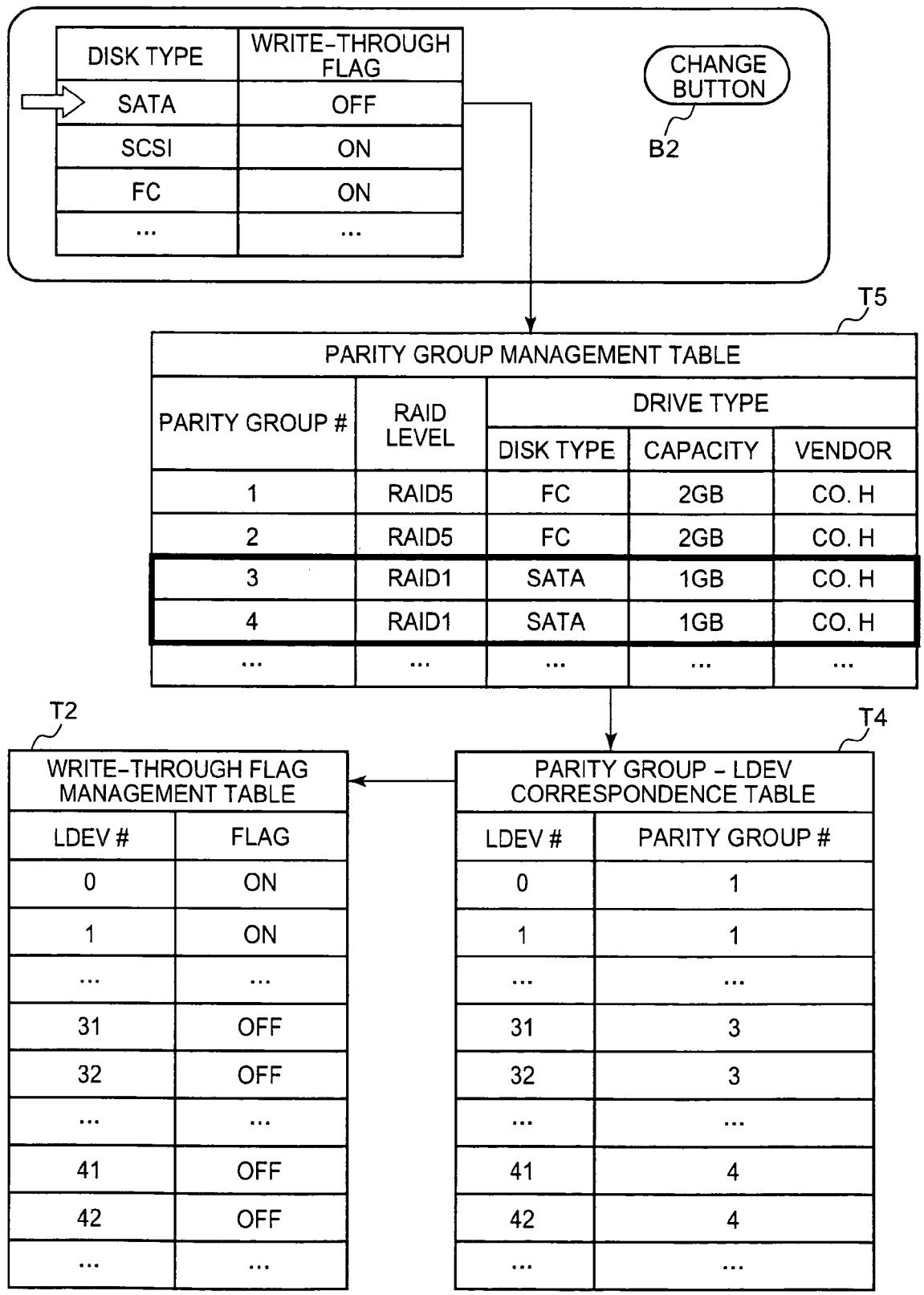
FIG. 29 is an illustrative diagram showing an example of a screen for setting a write-through flag for respective disk types.

A tenth embodiment is now described on the basis of FIG. 28 and FIG. 29. In this embodiment, it is possible to set the processing mode for write access operations, respectively and independently, for each type of disk drive 161. FIG. 28 is a flowchart showing a write-through flag setting process;

The user logs in to the SVP 170 via the management terminal 30 (S231), calls up the write-through flag setting screen as illustrated in the upper portion of FIG. 29, and sets a write-through flag for a desired disk type (S232).

By referring to the parity group management table T5 stored in the shared memory 140, for example, the SVP 170 detects the respective parity groups which use the disk type for which the user has set (or changed) the write-through flag (S233). Here, the parity group management table T5 may be composed, for example, by respectively associating a parity group number, a RAID level and a drive type. The drive type may also include, for example, the disk type, the storage capacity, and the disk drive supplier.

By referring to the parity group—LDEV correspondence table T4, the SVP 170 detects all of the LDEVs belonging respectively to the detected parity groups (S234), and it changes the write-through flags of all of the LDEVs belonging the parity groups, as illustrated by the write-through flag management table T2 in the lower part of FIG. 29, for example (S235). The SVP 170 updates the write-through flags in the respective LDEV control tables T1 managing the respective LDEVs belonging to that parity group (S236), and then transfers the updated information respectively to the CHAs 110 (S237).

Thereby, it is possible to process a write access operation in accordance with the type of disk, for example, if an abnormality has occurred in the cache memory 130.

11. Eleventh Embodiment

Figure 30:
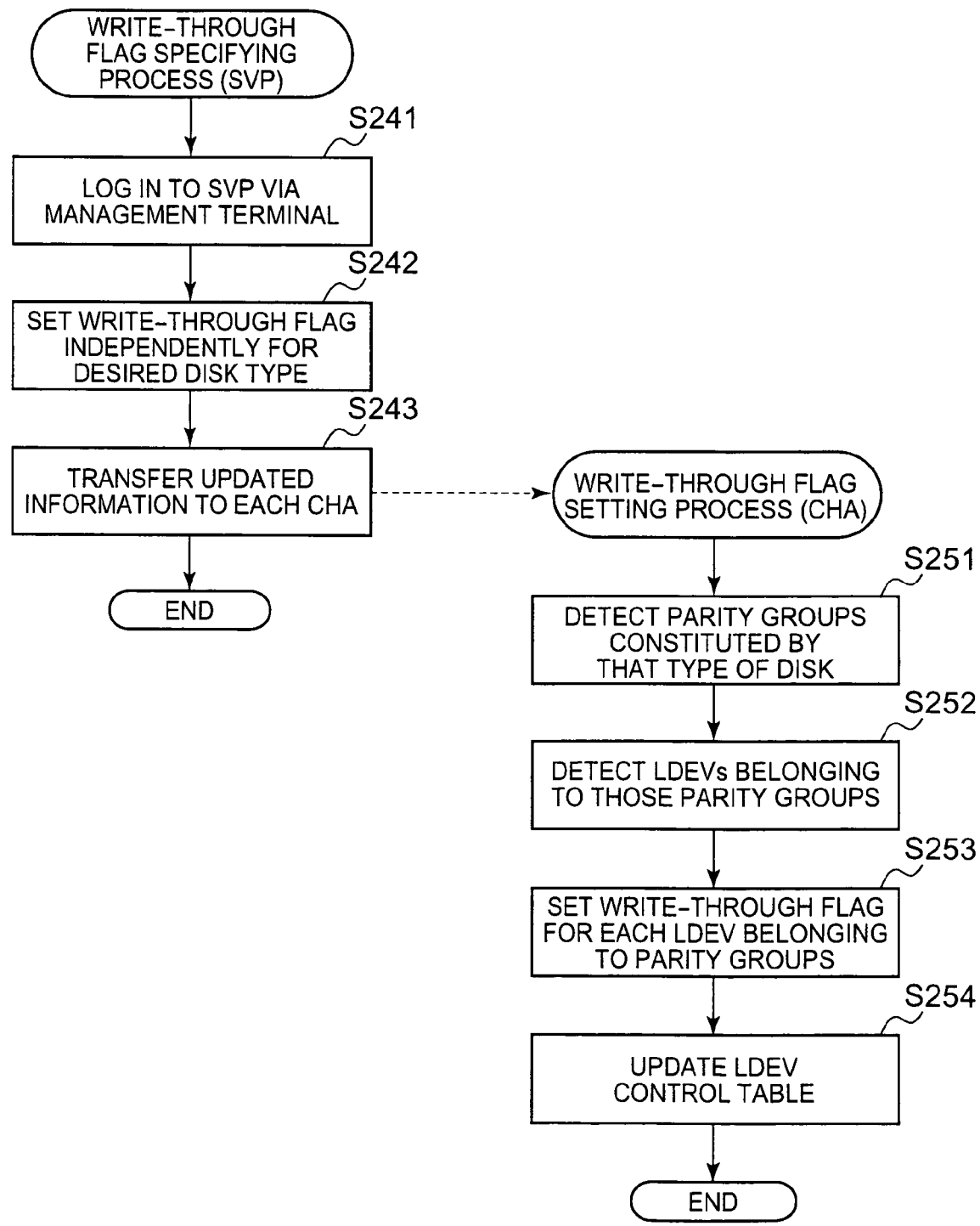
FIG. 30 is a flowchart showing a write-through flag specifying and setting process used in an eleventh embodiment.

An eleventh embodiment is now described on the basis of FIG. 30. In this embodiment, the processing mode for write access operations is set respectively and independently, for each type of disk drive 161, by joint action of the SVP 170 and the CHA 110.

FIG. 30 is a flowchart showing a write-through flag setting process. The user logs in to the SVP 170 from the management terminal 30 (S241), and sets a write-through flag for a desired disk type (S242). The SVP 170 transfers the updated information respectively to each of the CHAs 110 (S243).

A prescribed CHA 110 detects the respective parity groups that use disk drives 161 of the disk type for which the write-through flag has been set (S251), and it then detects all of the LDEVs belonging respectively to the parity groups thus detected (S252), and changes the write-through flags in all of the LDEVs belonging to that parity group (S253). The CHA 110 respectively updates the write-through flags in each of the LDEV control tables T1 which manage the respective LDEVs belonging to the parity group (S254).

12. Twelfth Embodiment

Figure 31:
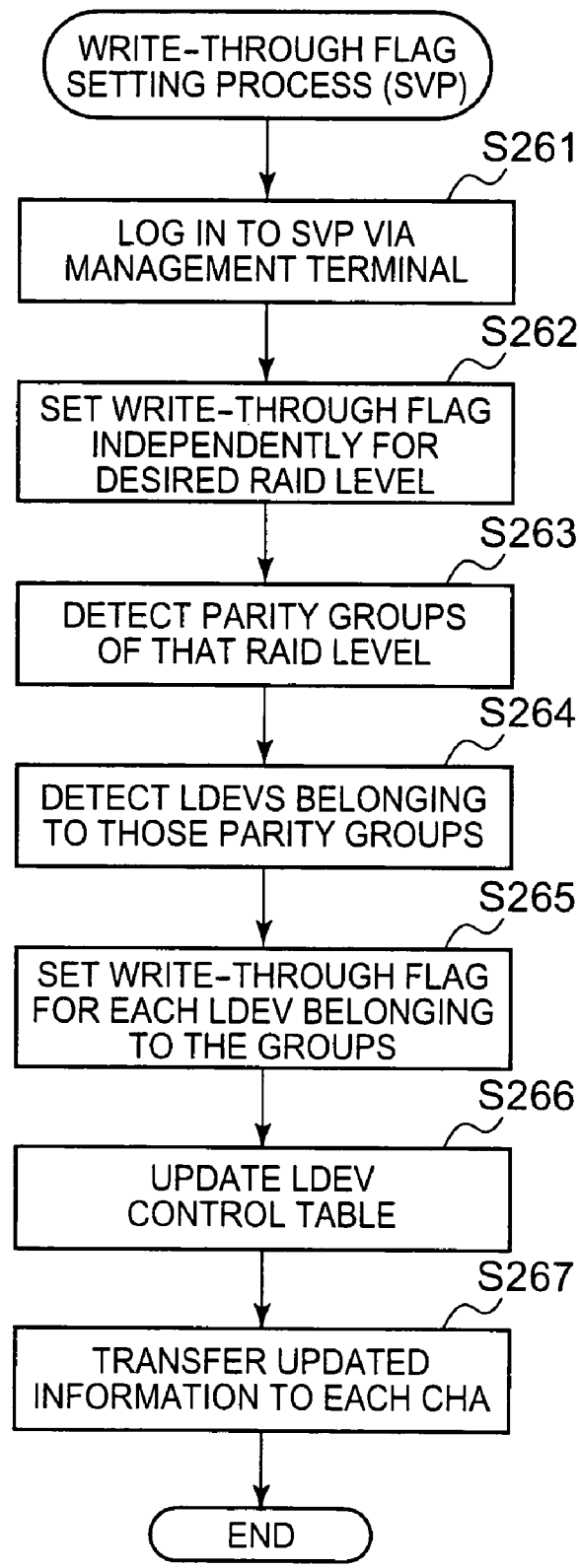
FIG. 31 is a flowchart of a write-through flag setting process used in a twelfth embodiment.
Figure 32:
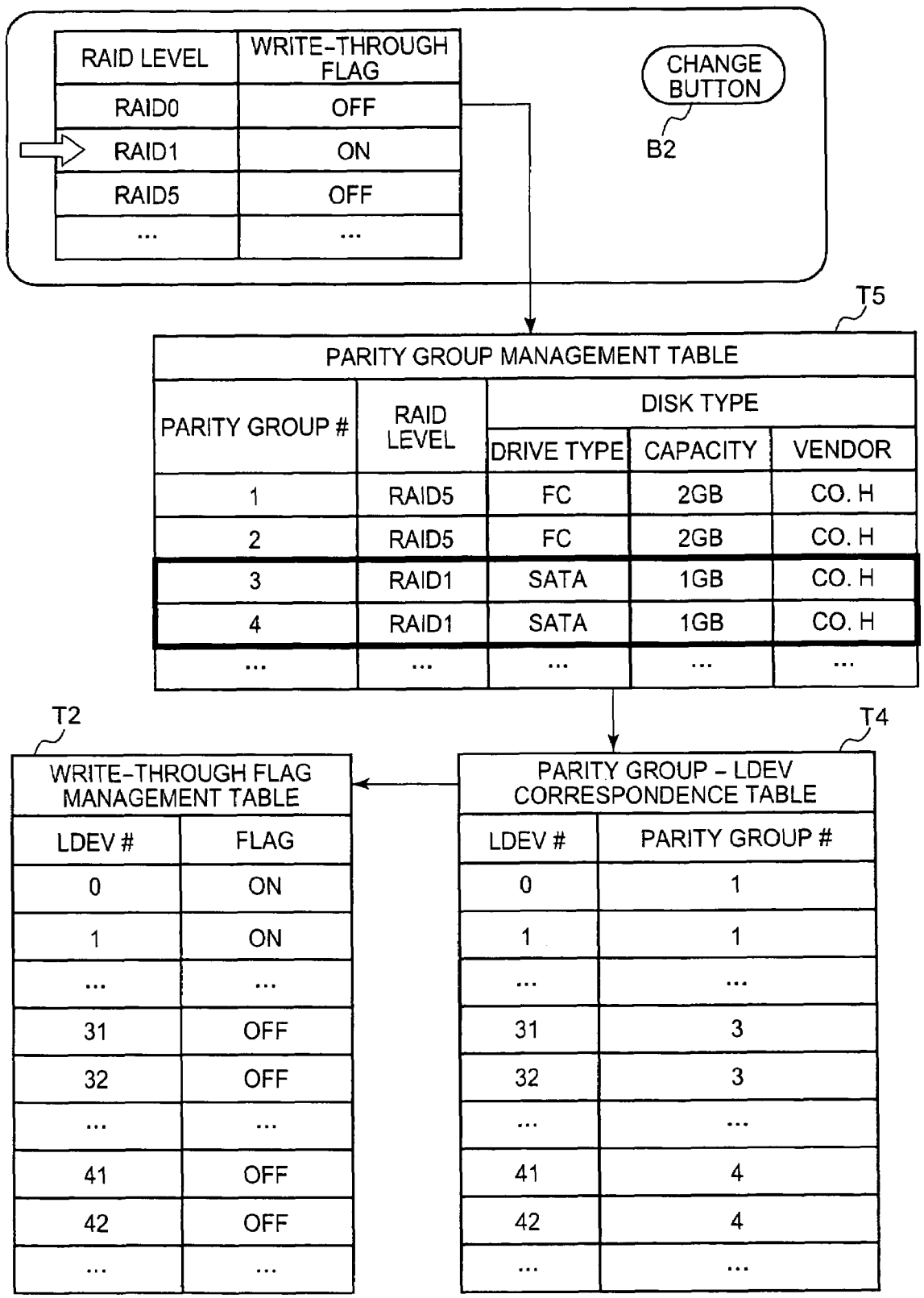
FIG. 32 is an illustrative diagram showing an example of a screen for setting a write-through flag for respective RAID levels.

A twelfth embodiment is now described on the basis of FIG. 31 and FIG. 32. In this embodiment, it is possible to set the processing mode for write access operations, respectively and independently, for each RAID level. FIG. 31 is a flowchart showing a write-through flag setting process.

The user logs in to the SVP 170 via the management terminal 30 (S261), calls up the write-through flag setting screen as illustrated in the upper portion of FIG. 32, and sets a write-through flag for a desired RAID level (S262). The SVP 170 detects the respective parity groups of the RAID level for which the write-through flag has been set (S263).

By referring to the parity group—LDEV correspondence table T4, the SVP 170 detects all of the LDEVs belonging respectively to the detected parity groups (S264), and it changes the write-through flags of all of the LDEVs belonging the parity groups, as illustrated by the write-through flag management table T2 in the lower part of FIG. 32, for example (S265). The SVP 170 updates the write-through flags in the respective LDEV control tables T1 managing the respective LDEVs belonging to that parity group (S266), and then transfers the updated information respectively to the CHAs 110 (S267).

Thereby, it is possible to process a write access operation in accordance with the RAID level, for example, if an abnormality has occurred in the cache memory 130. For example, in the case of RAID0, the storage capacity is simply combined and even when a write-through operation is performed, the processing time is not very considerable. In other words, the write penalty is small. Furthermore, in the case of RAID1, data is simply mirrored and no complicated computations, or the like, are required. Therefore the write penalty is also small. Accordingly, in the case of RAID0 or RAID1, for example, the write-through flag can be set to on, so that write access operations are processed by a write-through method. Furthermore, in the case of RAID levels which require parity calculations, such as RAID5, it is necessary to read out the old data and old parity, and then recalculate the parity and write the new data and new parity. Therefore, the write penalty is large. Accordingly, in the case of RAID5, for instance, the write-through flag can be set to off, so that good response can be maintained.

13. Thirteenth Embodiment

Figure 33:
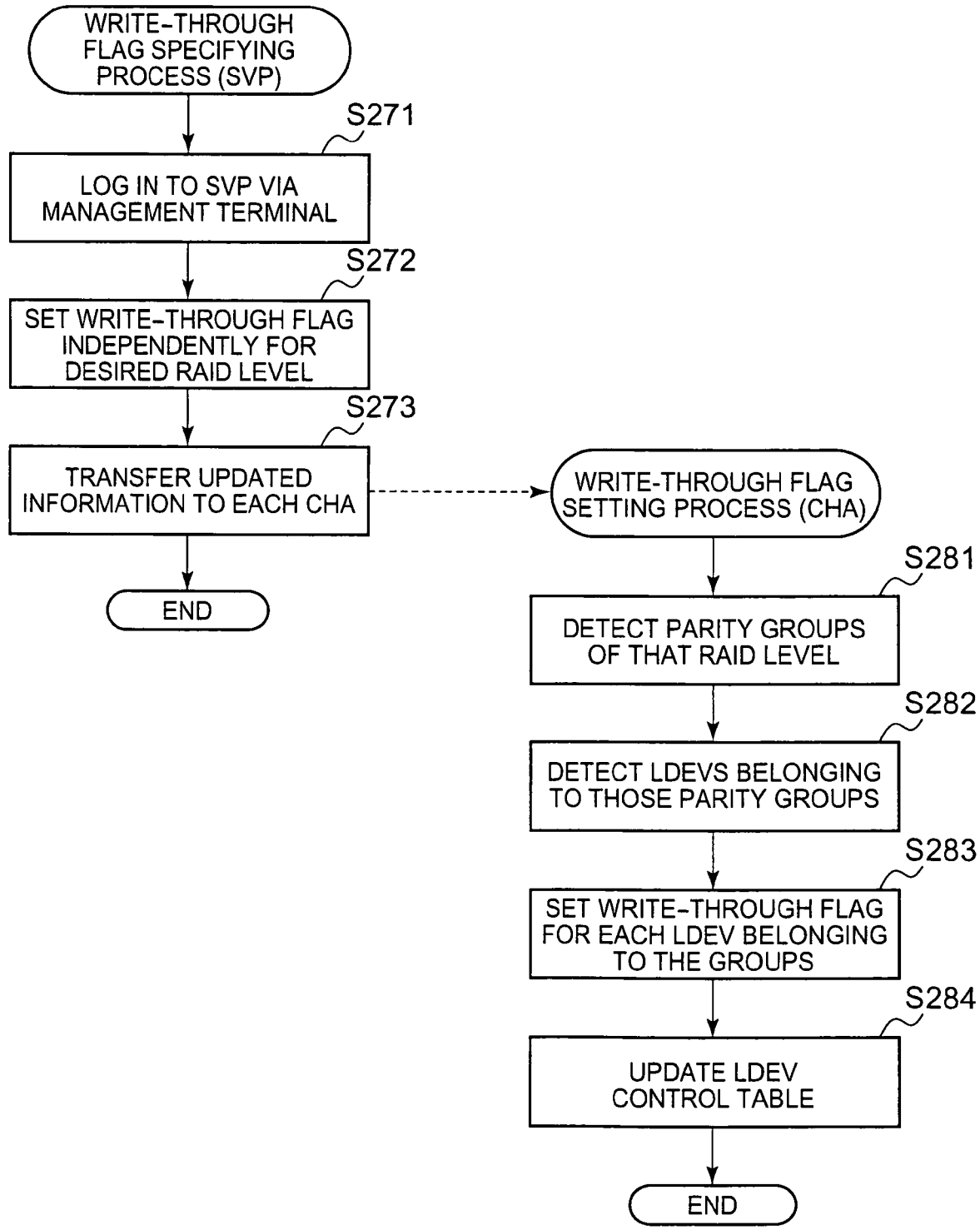
FIG. 33 is a flowchart showing a write-through flag specifying and setting process used in a thirteenth embodiment.

A thirteenth embodiment is now described on the basis of FIG. 33. In this embodiment, the processing mode for write access operations is set respectively and independently, for each type of disk drive 161, by joint action of the SVP 170 and the CHA 110.

FIG. 33 is a flowchart showing a write-through flag setting process. The user logs in to the SVP 170 from the management terminal 30 (S271), and sets a write-through flag for a RAID level (S272). The SVP 170 transfers the updated information respectively to each of the CHAs 110 (S273).

A prescribed CHA 110 detects the respective parity groups of the RAID level for which the write-through flag has been set (S281). The CHA 110 then detects all of the LDEVs belonging respectively to the parity groups thus detected (S282), and it respectively changes the write-through flags of all of the LDEVs belonging to the parity groups (S283). The CHA 110 respectively updates the write-through flags in each of the LDEV control tables T1 which manage the respective LDEVs belonging to the parity group (S284).

14. Fourteenth Embodiment

Figure 34:
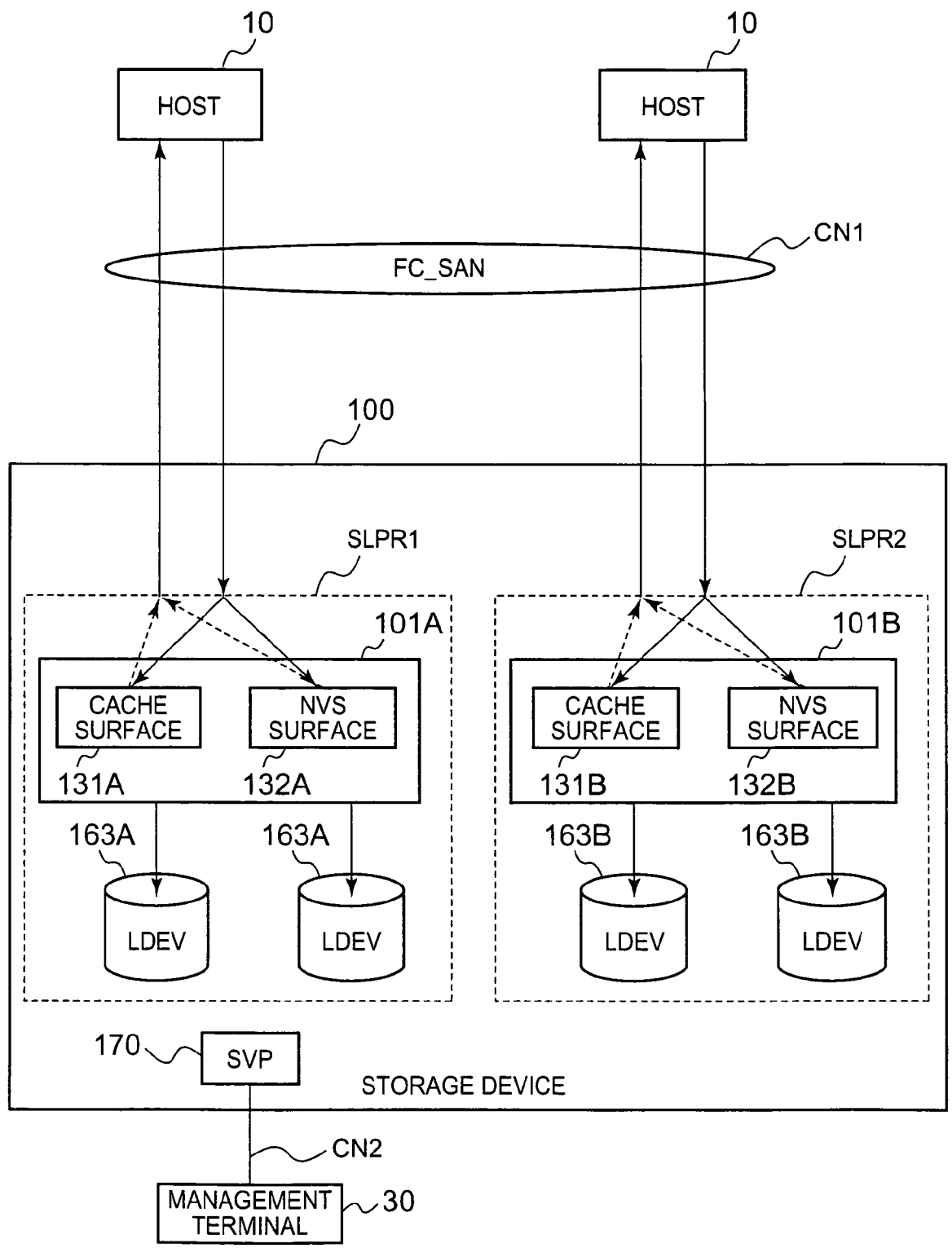
FIG. 34 is an illustrative diagram showing an overview of a storage system according to a fourteenth embodiment.
Figure 35:
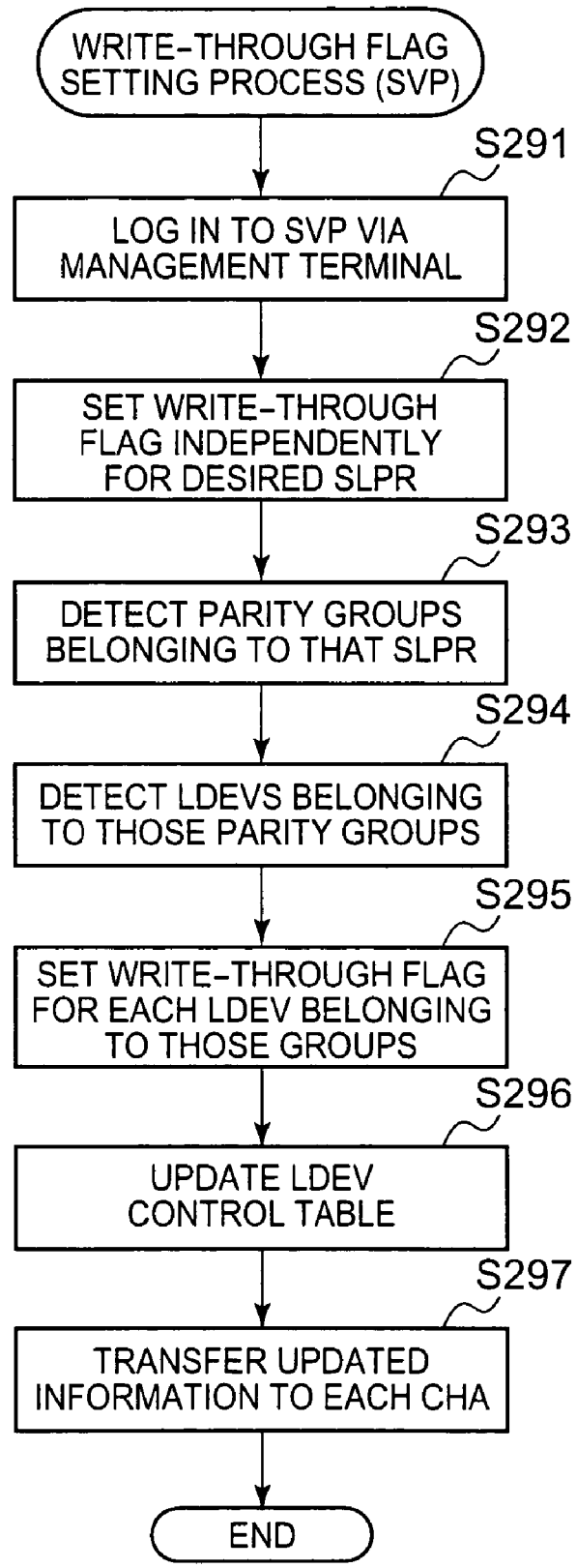
FIG. 35 is a flowchart showing a write-through flag setting process.
Figure 36:
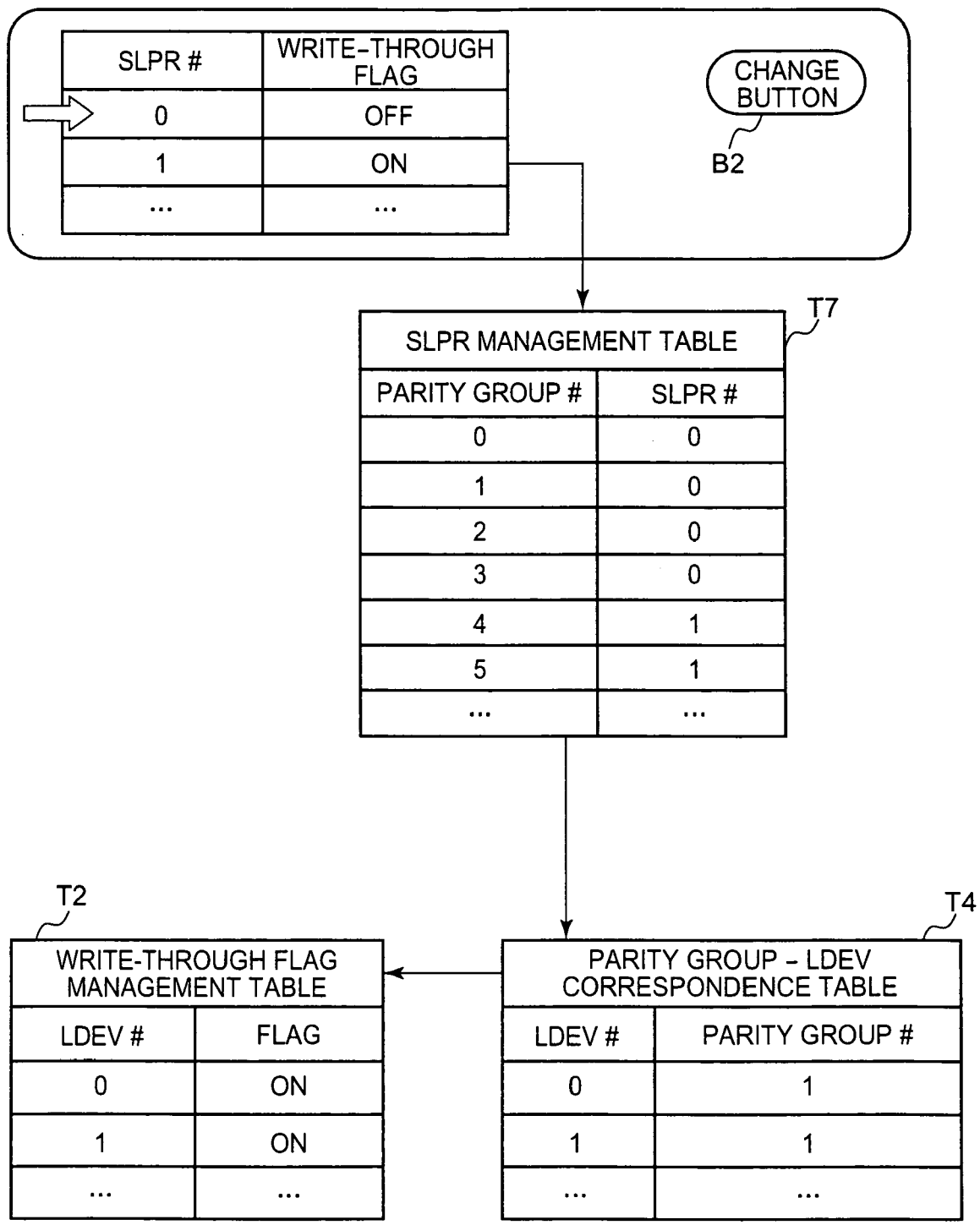
FIG. 36 is an illustrative diagram showing an example of a screen for setting a write-through flag for respective SLPRs (virtual frames)

A fourteenth embodiment is now described on the basis of FIG. 34 to FIG. 36. In the present embodiment, the processing mode used for write access in the event of an abnormality in the cache memory can be set respectively for each virtual frame (SLPR) provided inside the storage device 100.

FIG. 34 is an illustrative diagram showing a simplified view of the composition of the storage system. A plurality of SLPRs may be provided in the storage device 100. An SLPR is formed by dividing resources, such as the cache memory or volumes of the storage device 100, on a logical basis. Each SLPR behaves as if it were an independent virtual storage device located within a single storage device 100.

The SLPRs 1 and 2 each have virtual controllers 101A and 101B, a virtual cache memory, and volumes 163A and 163B. SLPR1 comprises a cache surface 131A and NVS surface 132A as write caches, and similarly, SLPR2 comprises a cache surface 131B and NVS surface 132B as write caches. The controllers 101A and 101B, the write caches, and the like, are not actually formed as separate physical entities, but rather, they are constituted by dividing up the control functions and the cache memory of the storage device 100, into logical sections.

FIG. 35 is a flowchart showing a write-through flag setting process. The user logs in to the SVP 170 via the management terminal 30 (S291), calls up the write-through flag setting screen as illustrated in the upper portion of FIG. 36, and sets a write-through flag for a desired SLPR (S292).

The SVP 170 detects the respective parity groups in the SLPR for which the write-through flag has been set (S293).

By referring to the parity group—LDEV correspondence management table T4, which manages parity group numbers and SLPR numbers in a mutually associated fashion, and to the SLPR management table T7, the SVP 170 detects all of the LDEVs belonging respectively to the detected parity groups (S294). The SVP 170 then respectively changes the write-through flags of all of the LDEVs belonging to those parity groups, as illustrated by the write-through flag management table T2 in the lower part of FIG. 36, for example (S295). The SVP 170 updates the write-through flags in the respective LDEV control tables T1 managing the respective LDEVs belonging to that parity group (S296), and then transfers the updated information respectively to the CHAs 110 (S297).

15. Fifteenth Embodiment

Figure 37:
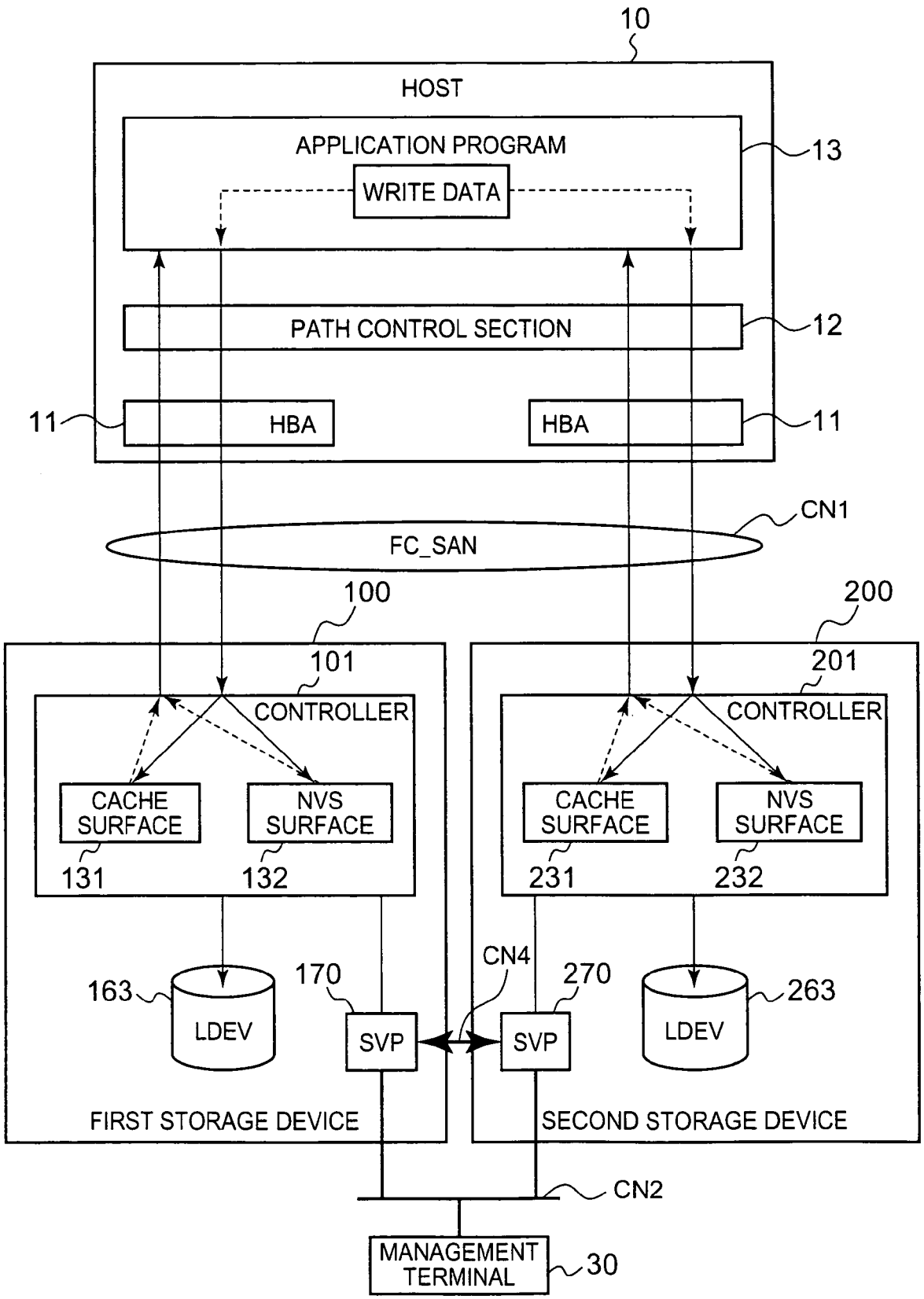
FIG. 37 is an illustrative diagram showing an overview of a storage system according to a fifteenth embodiment.
Figure 38:
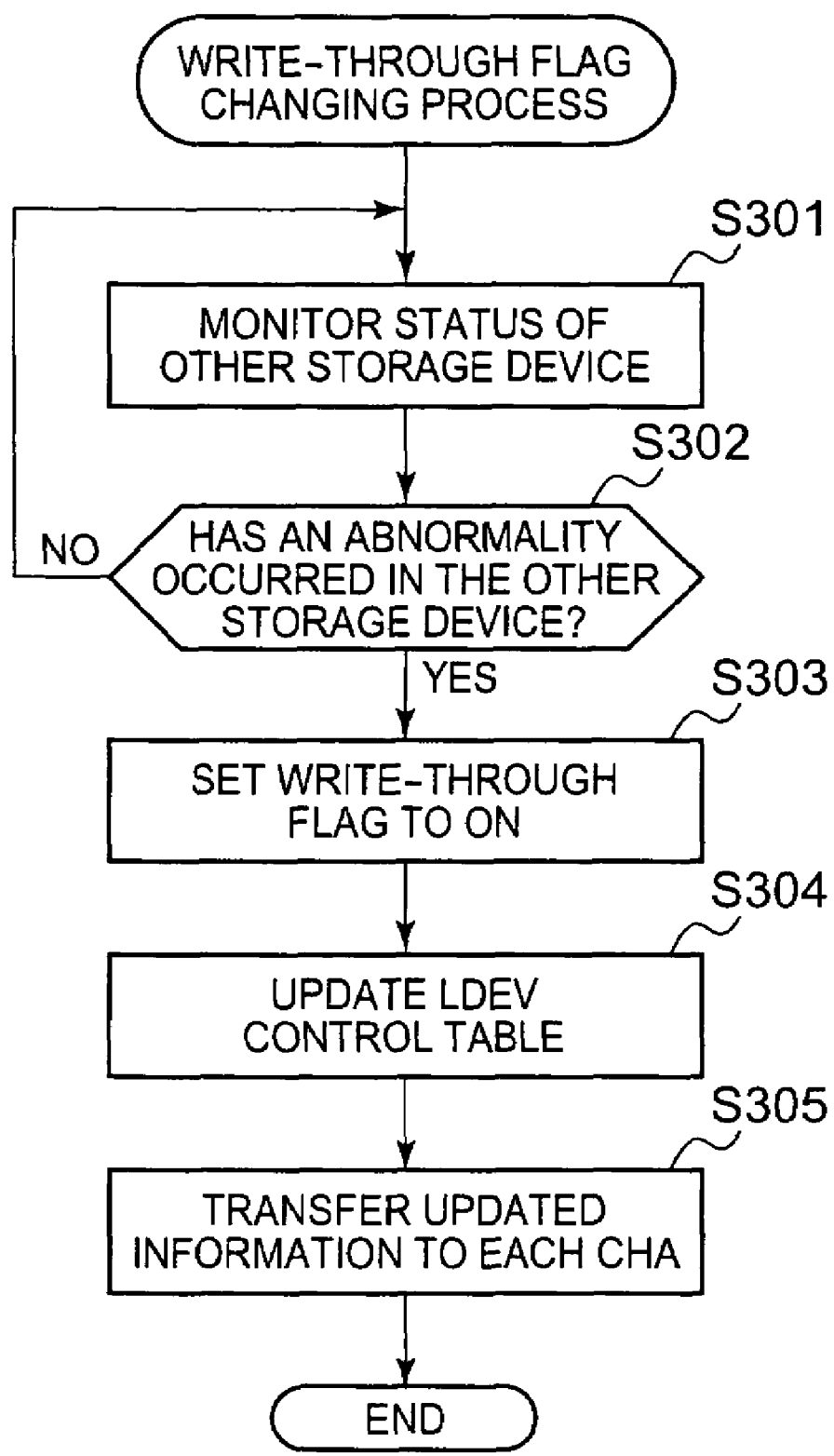
FIG. 38 is a flowchart showing a write-through flag changing process.

A fifteenth embodiment is now described on the basis of FIG. 37 and FIG. 38. In the present embodiment, if a fault occurs in one storage device of a plurality of storage devices 100 and 200 respectively storing the same data, the processing mode for write access used in the event of an abnormality in the cache memory of the other storage device is changed.

FIG. 37 shows general composition of a storage system according to the present embodiment. This storage system comprises two storage devices 100 and 200. The storage device 200 may be composed in the same manner as the storage device 100, and comprises a controller 201, LDEVs 263 and an SVP 270, for example. However, the respective storage devices 100 and 200 do not have to have the same composition.

The host 10 writes the same data respectively to both the LDEV 163 of the storage device 100 and the LDEV 263 of the storage device 200. When the storage device 100 has written the write data from the host 10 to both the cache surface 131 and the NVS surface 132, then it reports completion of the write operation. Similarly, when the storage device 200 has written the write data from the host 10 to both the cache surface 231 and the NVS surface 232, then it reports completion of the write operation.

Here, if a fault has occurred in the cache memory 130 of the storage device 100, for example, then the storage device 100 processes write access operations by means of either the second processing mode or the third processing mode, as described previously. If the other storage device 200 is operating normally, then the same write data is also stored in the storage device 200, and therefore it is possible to use the third processing mode more frequently in the storage device 100.

Even supposing that the write data stored in the cache memory 130 of the storage device 100 only were to be lost, then data matching this write data will still be stored in the storage device 200.

However, if a fault occurs in the storage device 200 and the system shuts down, then the write data will be held by the storage device 100 only, and hence the importance of the storage device 100 in the storage system increases. Similarly, if the storage device 200 has been shut down previously, the write data will only be held in the remaining storage device 100. Therefore, in this embodiment, if a fault occurs in the other storage device 200, the processing mode used for write access in the storage device 100 is changed.

FIG. 38 is a flowchart showing a write-through flag changing process. Taking an example where the process is executed in the storage device 100, the SVP 170 of the storage device 100 and the SVP 270 of the storage device 200 each monitor the operational status of the other device, by means of a communications network CN4, such as a LAN (S301).

If the SVP 170 detects that an abnormality has occurred in the other storage device 200 (S302: YES), then the write-through flags set respectively for the prescribed units (for example, for each respective LDEV, LU, parity group, disk type, or the like) are changed to on (S303). The SVP 170 updates the LDEV control table (S304), and it transfers the updated information to each of the CHAs 110 (S305).

In this way, in this embodiment, even if the redundancy declines in the storage system as a whole, the reliability of the storage system is maintained by increasing the level of redundancy in one storage device.

The present invention is not limited to the embodiments described above. It is possible for a person skilled in the art to make various additions, modifications, or the like, without departing from the scope of the present invention. For example, the write data is not limited to being stored in a two-layered fashion by means of write caches, and a composition may also be adopted wherein redundant storage is provided by dividing into parity and data, and in RAID5, for example.

What is claimed is:

1. A storage device comprising:
    a controller for respectively controlling data transmission and reception between a host device and a group of storage devices; and a cache memory used by said controller, for storing write data received from said host device, in a non-redundant fashion or a redundant fashion;
    wherein said controller is previously provided with processing modes for cases where a write command is received from said host device, namely:
    (1) a first processing mode wherein the completion of processing is reported to said host device when said write data has been stored in a redundant fashion in said cache memory, and after completion having been reported, said write data stored in a redundant fashion in said cache memory is written to said group of storage devices at a prescribed timing;
    (2) a second processing mode wherein the completion of processing is reported to said host device when said write data stored in a non-redundant fashion in said cache memory has been written to said group of storage devices; and
    (3) a third processing mode wherein the completion of processing is reported to said host device when said write data has been stored in a non-redundant fashion in said cache memory, and after completion having been reported, said write data stored in a non-redundant fashion in said cache memory is written to said group of storage devices at a prescribed timing; and
    said controller is able to execute any one of said processing modes for each memory unit of prescribed memory units that have been established previously,
    wherein said controller includes a mode selection table configured to contain a respective pre-set mode selection information for said each memory unit, where said respective pre-set mode selection information is for designating whether or not said third processing mode should be executed for a corresponding memory unit instead of said second processing mode, in a situation when said write data is unable to be written in said redundant fashion in said cache memory, and
    wherein said controller utilizes said respective pre-set mode selection information for selecting execution of said second processing mode or said third processing mode for a corresponding memory unit when said write data is unable to be written in said redundant fashion in said cache memory.

2. The storage device according to claim 1, wherein said controller preferentially executes said first processing mode, and if said cache memory is not able to store said write data in a redundant fashion, said controller executes any one of said second processing mode or said third processing mode.

3. The storage device according to claim 1, wherein said controller preferentially executes said first processing mode, and if said cache memory is not able to store said write data in a redundant fashion, said controller executes any one of said second processing mode or said third processing mode, on the basis of previously established said respective mode selection information.

4. The storage device according to claim 1, wherein said controller preferentially executes said first processing mode if said cache memory is able to store said write data in a redundant fashion, said controller preferentially executes said second processing mode if said cache memory is not able to store said write data in a redundant fashion, and said controller executes said third processing mode if said cache memory is not able to store said write data in a redundant fashion and if said third processing mode has been selected by means of said respective mode selection information.

5. The storage device according to claim 1, wherein said controller respectively manages said respective mode selection information for previously setting an order of priority for said processing modes, in association with each one of said prescribed memory units, on the basis of instructions from an external device.

6. The storage device according to claim 1, wherein said prescribed memory unit is a logical volume established on a group of physical storage areas of said group of devices.

7. The storage device according to claim 1, wherein said prescribed memory unit is a logical unit (LU) associated with logical volumes established on a group of physical storage areas of said group of devices.

8. The storage device according to claim 1, wherein said prescribed memory unit is a group of physical storage areas of said group of devices.

9. The storage device according to claim 1, wherein said prescribed memory unit is the type of said group of storage devices.

10. The storage device according to claim 1, wherein said prescribed memory unit is a virtual frame generated by logically dividing said group of storage devices and said cache memory.

11. The storage device according to claim 1, wherein said cache memory comprises a plurality of cache regions, and the write data can be stored in a redundant fashion by storing said write data respectively in at least two or more of said cache regions, and furthermore, the write data can be stored in a non-redundant fashion by storing said write data in any one of said cache regions.

12. The storage device according to claim 1, wherein said controller is able to automatically set any one processing mode of said processing modes respectively for each of said prescribed memory units, by taking account of the circumstances of another storage device.

13. The storage device according to claim 1, wherein said controller automatically changes said prescribed memory unit for which said third processing mode is set to either one of said second processing mode or said first processing mode, if a fault has occurred in another storage device that receives and stores said write data.

14. A write access processing method for a storage device in which write data received from a host device is stored in a group of storage devices via a cache memory, wherein a plurality of processing modes are provided, including:
   (1) a first processing mode wherein the completion of processing is reported to said host device when said write data has been stored in a redundant fashion in said cache memory, and after completion having been reported, said write data stored in a redundant fashion in said cache memory is written to said group of storage devices at a prescribed timing;
   (2) a second processing mode wherein the completion of processing is reported to said host device when said write data stored in a non-redundant fashion in said cache memory has been written to said group of storage devices; and
   (3) a third processing mode wherein the completion of processing is reported to said host device when said write data has been stored in a non-redundant fashion in said cache memory, and after completion having been reported, said write data stored in a non-redundant fashion in said cache memory is written to said group of storage devices at a prescribed timing;
   and where said write access processing method for a storage device comprises:
   maintaining a mode selection table configured to contain a respective pre-set mode selection information for each memory unit of a plurality of prescribed memory units that have been established previously, where said respective pre-set mode selection information is for designating whether or not said third processing mode should be executed for a corresponding memory unit instead of said second processing mode, in a situation when said write data is unable to be written in said redundant fashion in said cache memory
   receiving said write data from said host device;
   judging whether or not said cache memory is capable of redundant storage;
   executing said first processing mode if it is judged that said cache memory is capable of redundant storage;
   utilizing said respective pre-set mode selection information for selecting execution of said second processing mode or said third processing mode for a corresponding memory unit when said write data is unable to be written in said redundant fashion in said cache memory;
   executing said second processing mode, if it is judged that said second processing mode has been selected on the basis of said respective pre-set mode selection information; and
   executing said third processing mode, if it is judged that said second processing mode has not been selected on the basis of said respective pre-set mode selection information.

15. The write access processing method for a storage device according to claim 14, comprising automatically adopting the same processing mode respectively for a plurality of prescribed memory units that are mutually related among the prescribed memory units.

16. The write access processing method for a storage device according to claim 14, comprising automatically changing the mode selection information for all prescribed memory units of a plurality of previously-associated prescribed memory units, if the mode selection information for any one prescribed memory unit of the plurality of previously associated prescribed memory units has changed.

17. The write access processing method for a storage device according to claim 14, comprising:
   monitoring the circumstances of another storage device that receives and stores said write data from said host device;
   judging whether or not a fault has occurred in said other storage device;
   and changing said mode selection information in such a manner that said second processing mode is adopted for said prescribed memory unit, if it is judged that a fault has occurred in said other storage device.

18. A storage device comprising:
   a controller for respectively controlling data transmission and reception between a host device and a group of storage devices; and a cache memory used by said controller, for storing write data received from said host device, in a non-redundant fashion or a redundant fashion;
   wherein said controller is previously provided with processing modes for cases where a write command is received from said host device, namely:
   (1) a first processing mode wherein the completion of processing is reported to said host device when said write data has been stored in a redundant fashion in said cache memory, and after completion having been reported, said write data stored in a redundant fashion in said cache memory is written to said group of storage devices at a prescribed timing;
   (2) a second processing mode wherein the completion of processing is reported to said host device when said write data stored in a non-redundant fashion in said cache memory has been written to said group of storage devices; and
   (3) a third processing mode wherein the completion of processing is reported to said host device when said write data has been stored in a non-redundant fashion in said cache memory, and after completion having been reported, said write data stored in a non-redundant fashion in said cache memory is written to said group of storage devices at a prescribed timing; and
   said controller is able to execute any one of said processing modes for each memory unit of prescribed memory units that have been established previously,
   wherein said controller includes a mode selection table configured to contain a respective pre-set mode selection information for said each memory unit, where said respective pre-set mode selection information is for designating whether or not said third processing mode should be executed for a corresponding memory unit instead of said second processing mode, in a situation when said write data is unable to be written in said redundant fashion in said cache memory,
   wherein said controller utilizes said respective pre-set mode selection information for selecting execution of said second processing mode or said third processing mode for a corresponding memory unit when said write data is unable to be written in said redundant fashion in said cache memory, and
   wherein responsive to a selection of a processing mode for a prescribed memory unit of a plurality of prescribed memory units which have a predetermined mutual relationship to each other, said controller automatically adopts the same processing mode respectively for other prescribed memory units of said plurality of prescribed memory units which have said predetermined mutual relationship to each other.

19. The storage device according to claim 18, wherein said prescribed memory unit is a logical unit (LU) associated with logical volumes established on a group of physical storage areas of said group of devices.

20. The storage device according to claim 18, wherein said prescribed memory unit is a group of physical storage areas of said group of devices.

* * * * *